(12) United States Patent
Hirao et al.

(10) Patent No.: US 8,068,291 B2
(45) Date of Patent: Nov. 29, 2011

(54) IMAGING LENS, IMAGING DEVICE, PORTABLE TERMINAL, AND METHOD FOR MANUFACTURING IMAGING LENS

(75) Inventors: Yusuke Hirao, Sakai (JP); Keiji Matsusaka, Osaka (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 23 days.

(21) Appl. No.: 12/520,903

(22) PCT Filed: Feb. 19, 2008

(86) PCT No.: PCT/JP2008/052763
§ 371 (c)(1),
(2), (4) Date: Jun. 23, 2009

(87) PCT Pub. No.: WO2008/102775
PCT Pub. Date: Aug. 28, 2008

(65) Prior Publication Data
US 2010/0091387 A1 Apr. 15, 2010

(30) Foreign Application Priority Data
Feb. 19, 2007 (JP) .................................. 2007-038221

(51) Int. Cl.
*G02B 9/04* (2006.01)
*G02B 3/02* (2006.01)

(52) U.S. Cl. .......................... 359/793; 359/717; 359/796
(58) Field of Classification Search .................. 359/717, 359/793–795
See application file for complete search history.

(56) References Cited

U.S. PATENT DOCUMENTS

| | | | |
|---|---|---|---|
| 2005/0254147 A1* | 11/2005 | Wang et al. | 359/717 |
| 2006/0262416 A1 | 11/2006 | Lee et al. | 359/645 |
| 2006/0285229 A1 | 12/2006 | Ogawa | 359/754 |

FOREIGN PATENT DOCUMENTS

| | | |
|---|---|---|
| JP | 2004-312239 A | 11/2004 |
| JP | 2006-091638 A | 4/2006 |
| JP | 2006-098504 A | 4/2006 |
| JP | 2006-323365 A | 11/2006 |
| JP | 2006-349948 A | 12/2006 |
| JP | 2007-126636 A | 5/2007 |
| WO | WO 2008/102775 A1 | 8/2008 |

* cited by examiner

*Primary Examiner* — Scott J Sugarman
(74) *Attorney, Agent, or Firm* — Sidley Austin LLP

(57) ABSTRACT

An imaging lens (LN) includes one or two lens blocks (BK), and an aperture stop (ape). The lens block (BK) includes a plane-parallel lens substrate (LS) and a lens (L) formed of different materials. In the imaging lens (LN), a first lens block (BK1) disposed at the most object-side exerts a positive optical power, and a conditional formula defined by the absolute difference between the index of refraction of a first lens substrate (LS1) and the index of refraction of a lens (L[LS1*o*]) contiguous with an object-side substrate surface of the first lens substrate (LS) is fulfilled.

14 Claims, 20 Drawing Sheets

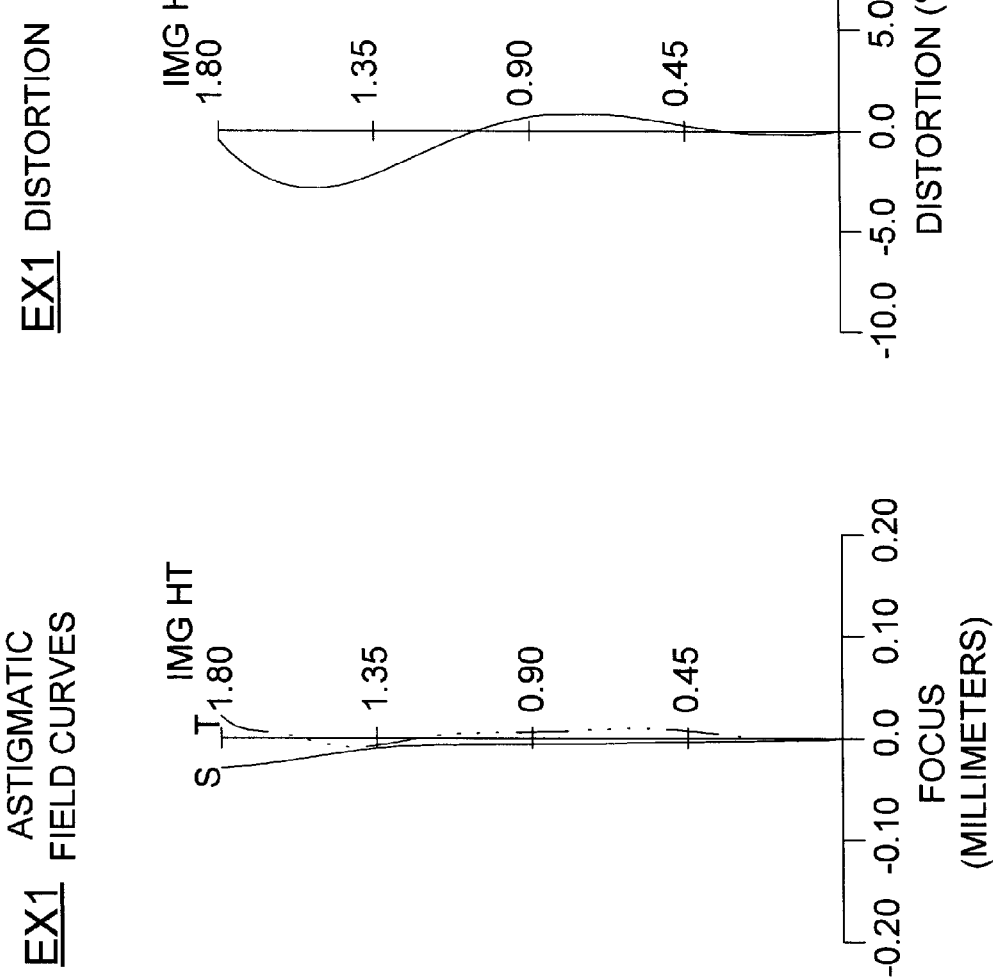

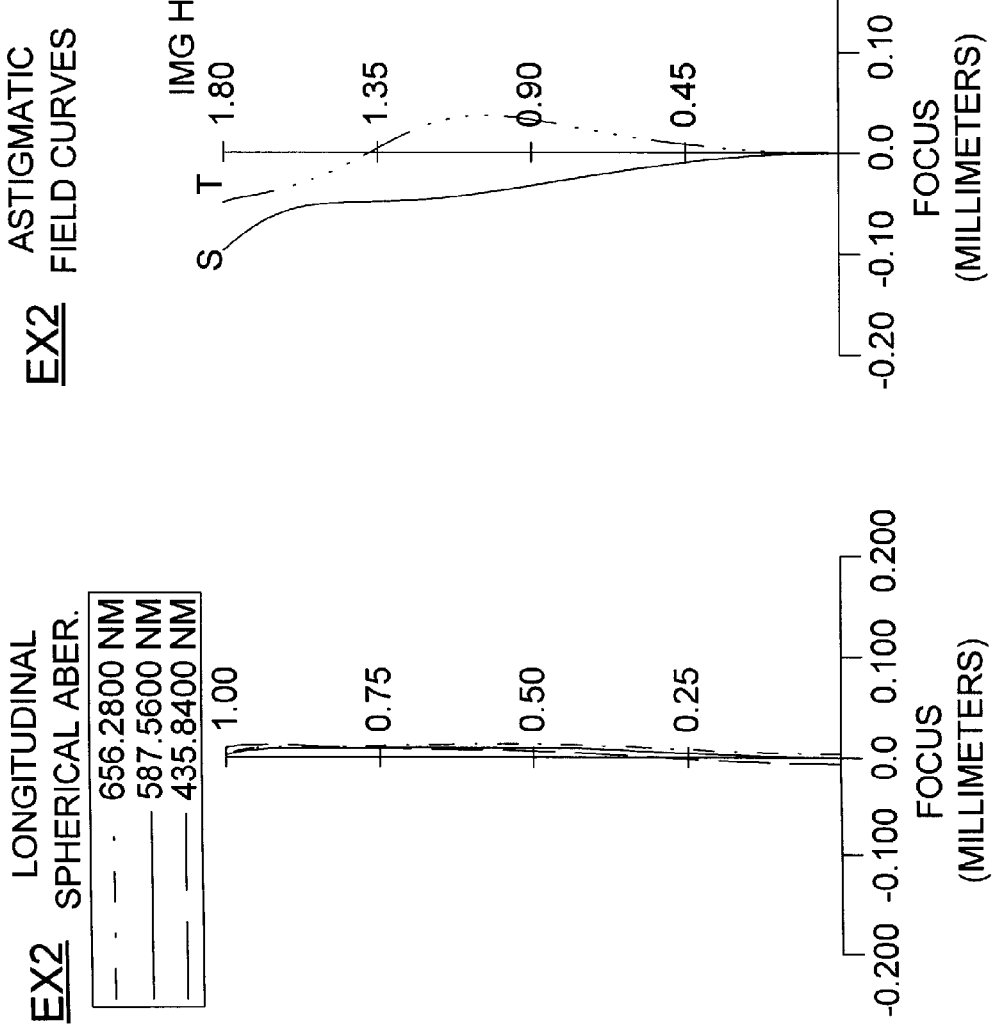
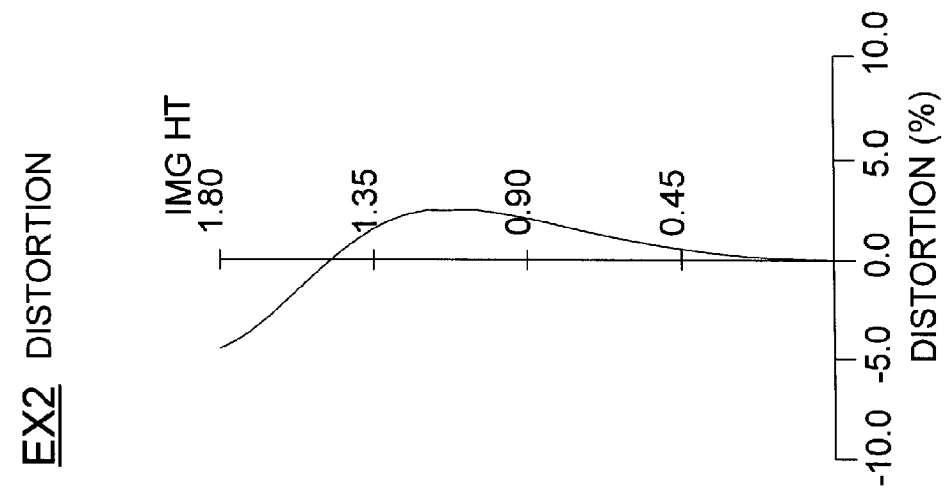

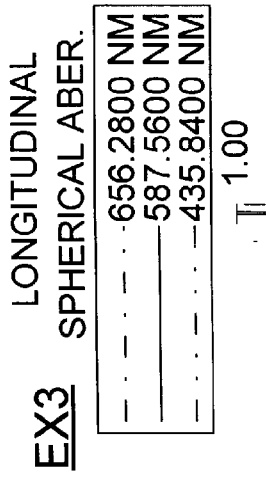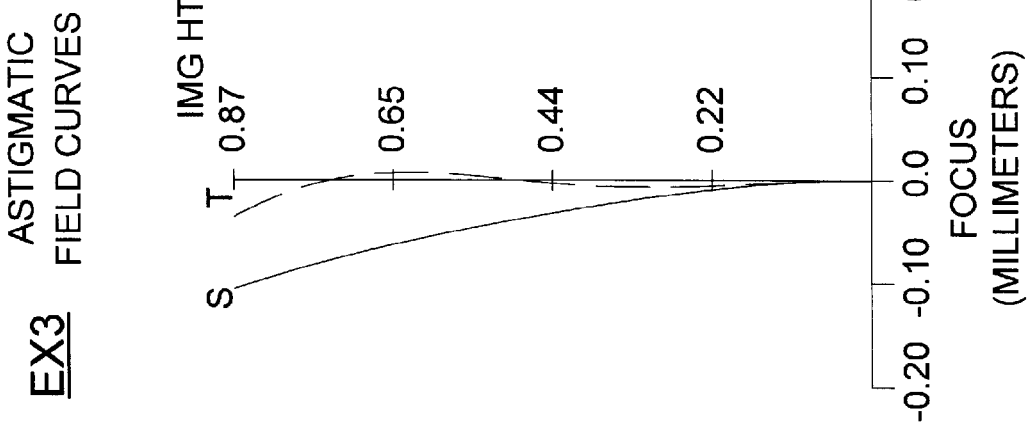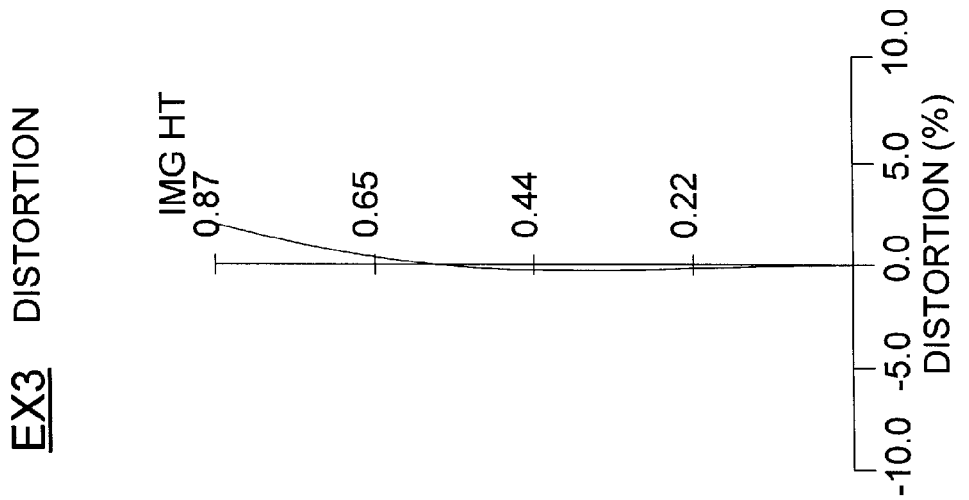

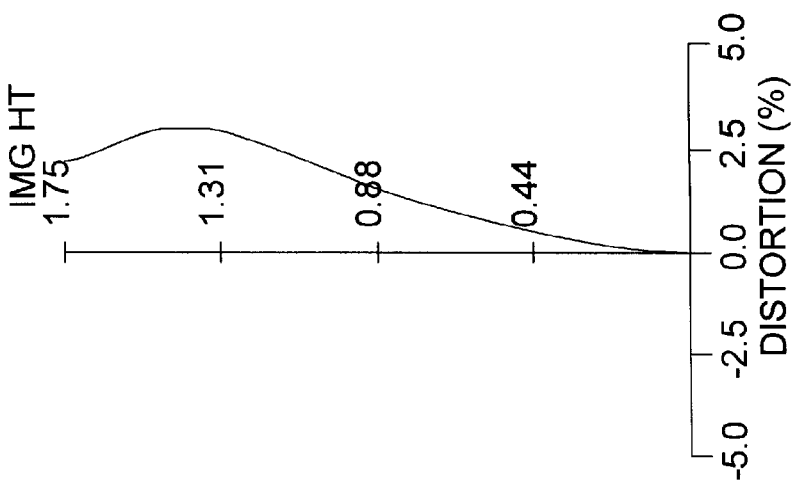
FIG.12C EX4 DISTORTION
FIG.12B EX4 ASTIGMATIC FIELD CURVES
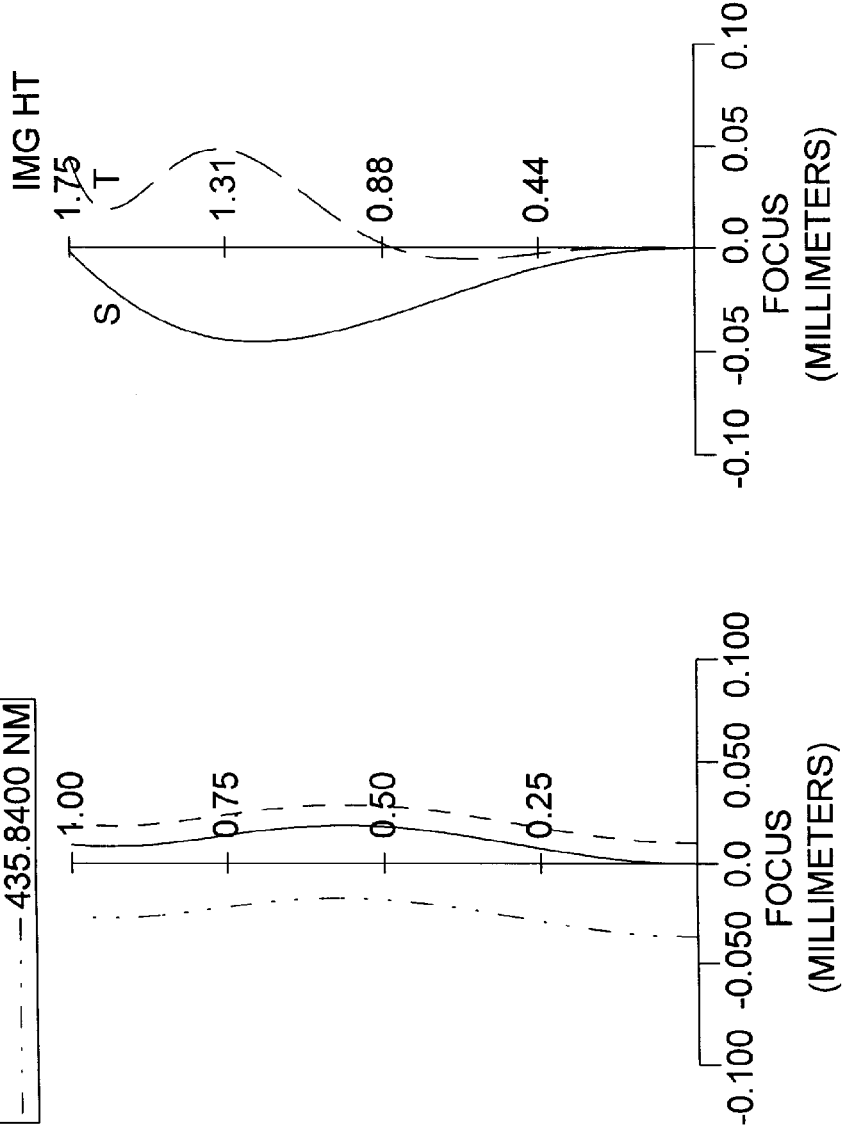
FIG.12A EX4 LONGITUDINAL SPHERICAL ABER.

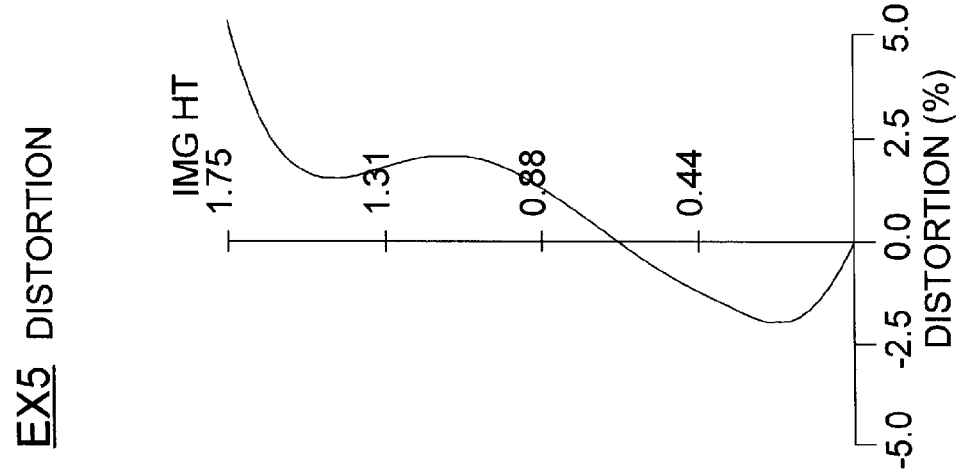
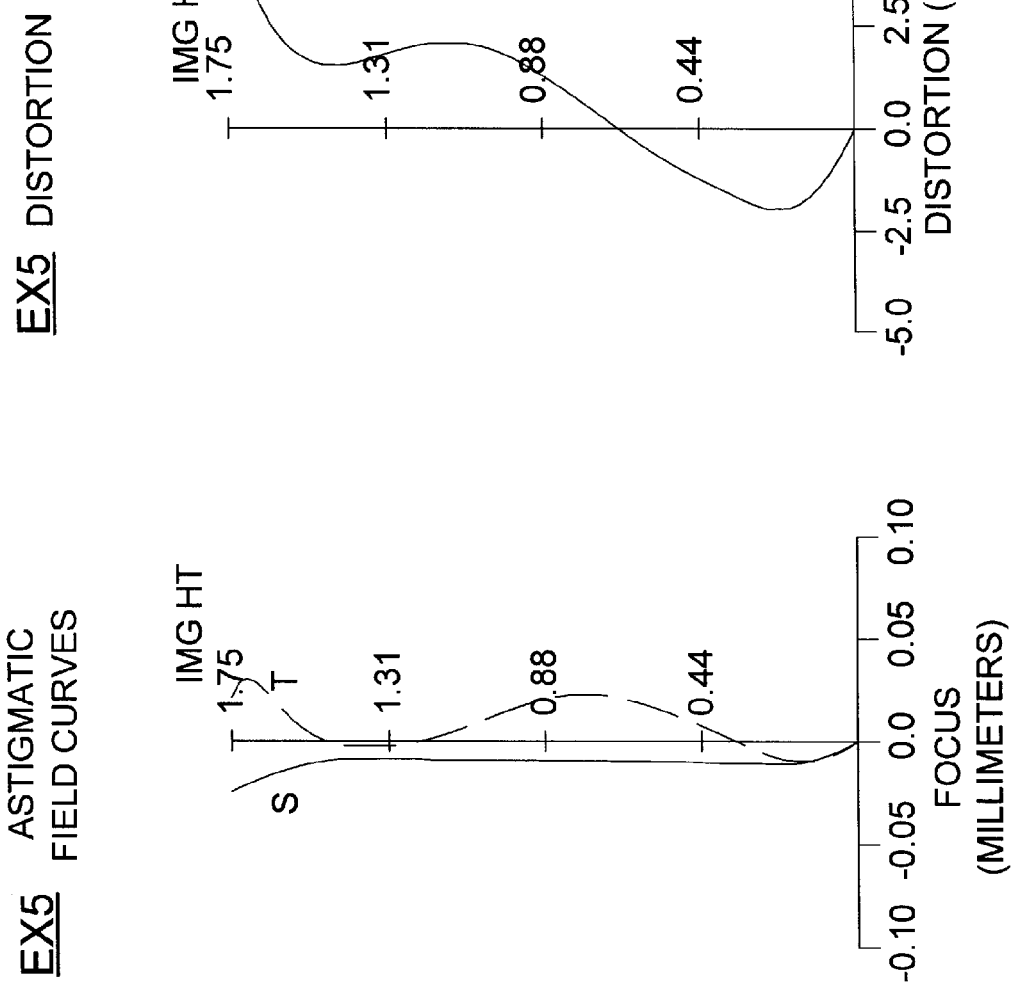
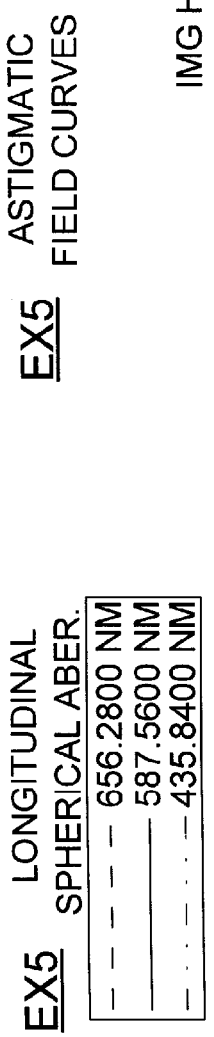

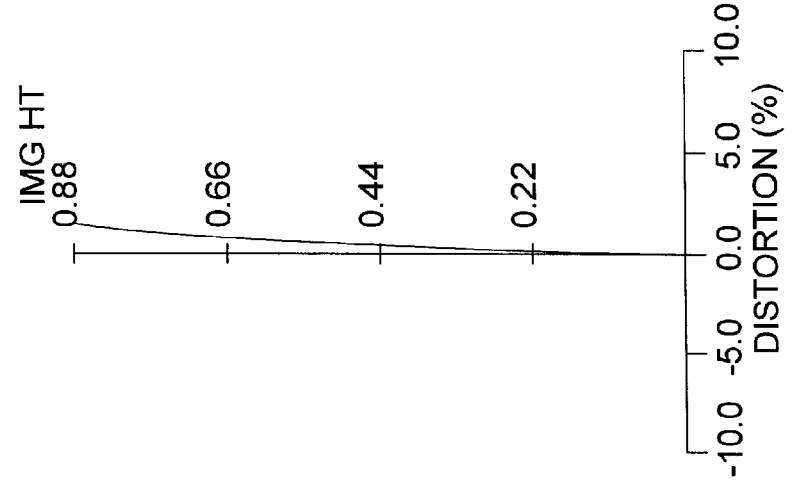
FIG.14A EX6 LONGITUDINAL SPHERICAL ABER.
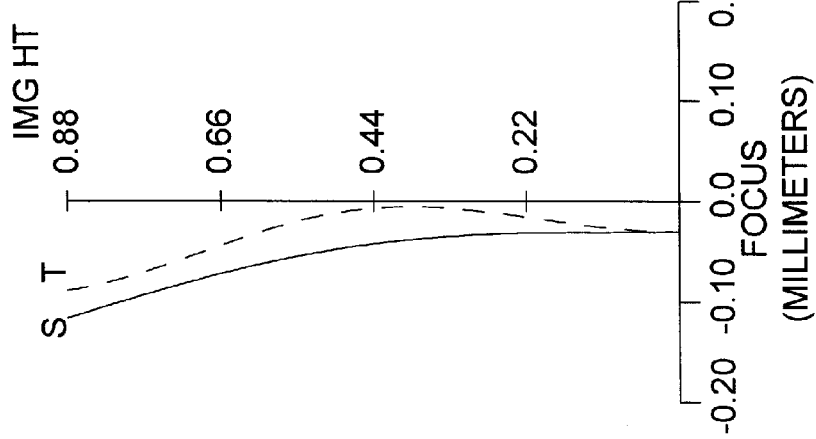
FIG.14B EX6 ASTIGMATIC FIELD CURVES
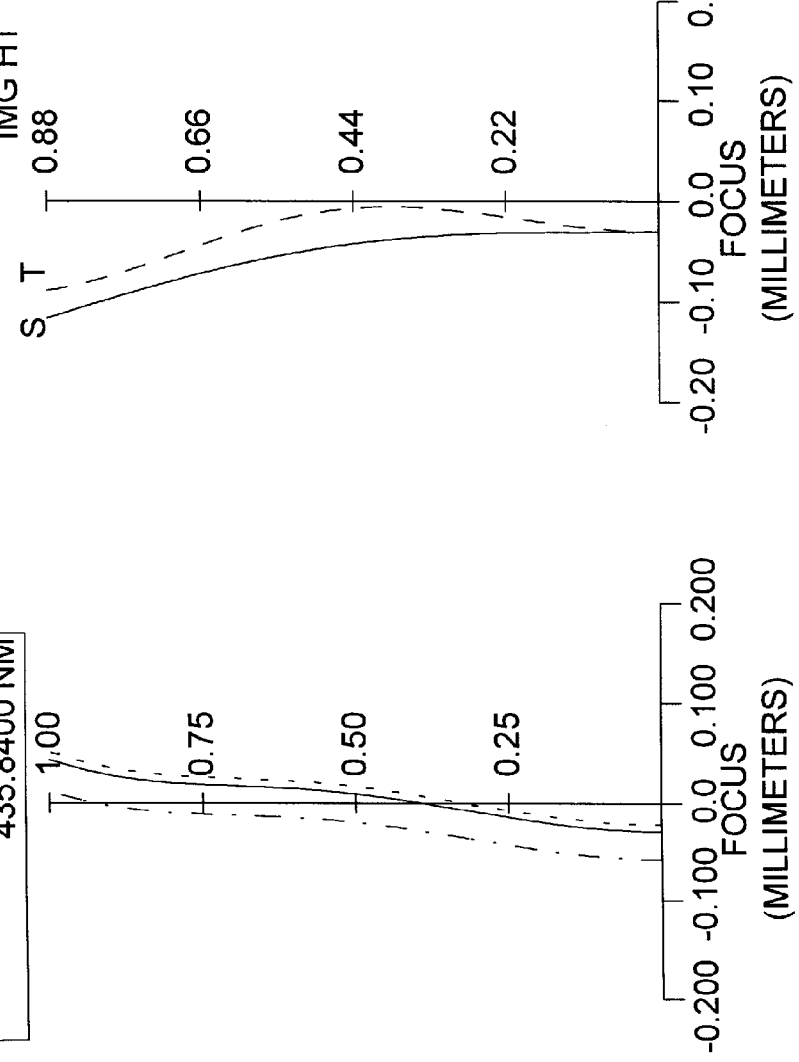
FIG.14C EX6 DISTORTION

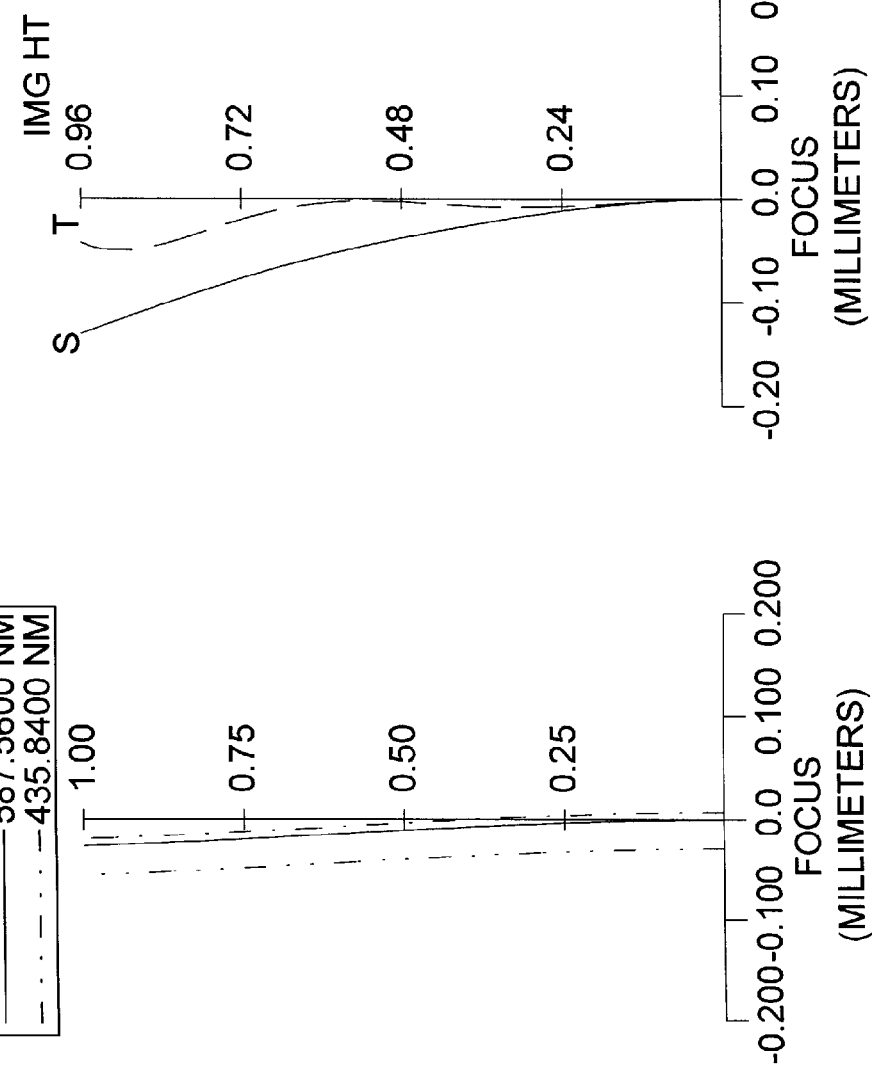
FIG.15C EX7 DISTORTION
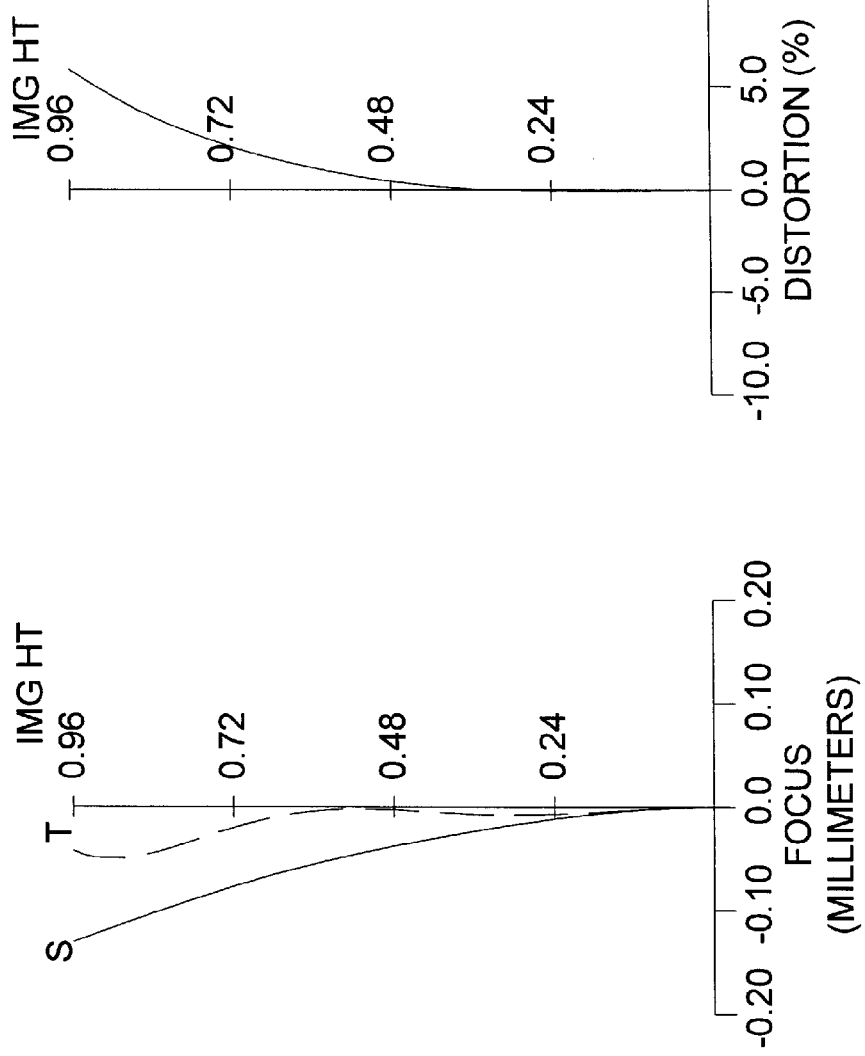
FIG.15B EX7 ASTIGMATIC FIELD CURVES
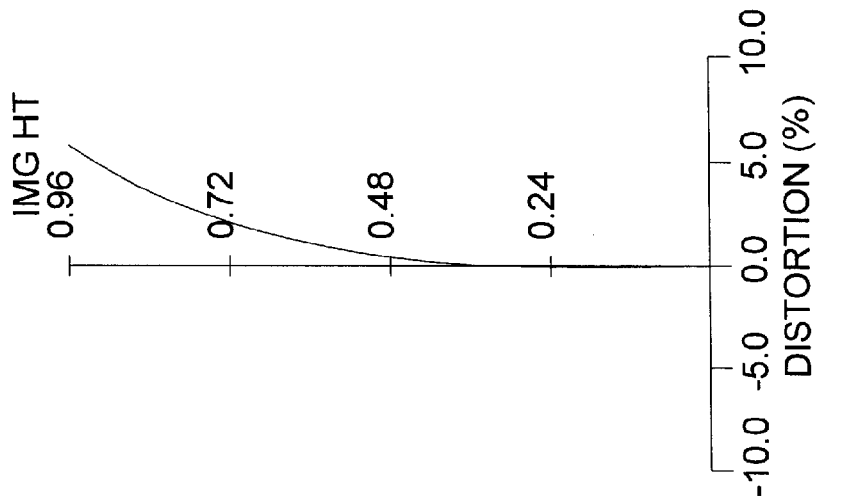
FIG.15A EX7 LONGITUDINAL SPHERICAL ABER.

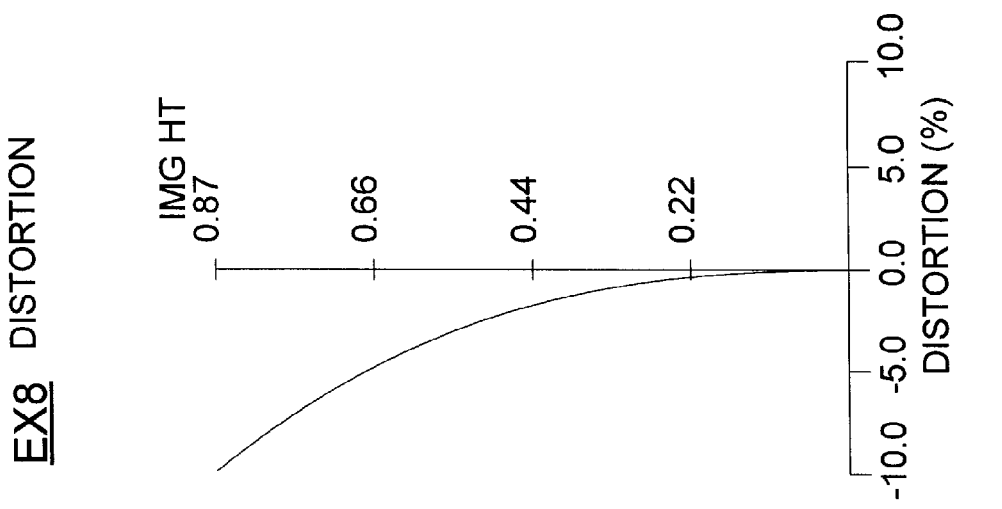
FIG.16C EX8 DISTORTION
FIG.16B EX8 ASTIGMATIC FIELD CURVES
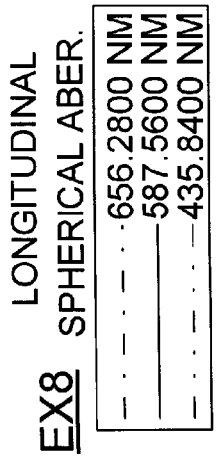
FIG.16A EX8 LONGITUDINAL SPHERICAL ABER.

IMAGING LENS, IMAGING DEVICE, PORTABLE TERMINAL, AND METHOD FOR MANUFACTURING IMAGING LENS

TECHNICAL FIELD

The present invention relates to an imaging lens, an imaging device, a portable terminal, and a method for manufacturing an imaging lens.

BACKGROUND ART

These days, compact, slim imaging devices are incorporated in compact, slim electronic appliances called portable terminals (for example, cellular phones, PDAs (personal digital assistants), etc.). Between such a portable terminal and, for example, an electronic appliance at a remote location, information such as sound information and image information is transferred bidirectionally.

Image sensors used in imaging devices are, for example, solid-state image sensors such as CCD (charge-coupled device) image sensors and CMOS (complementary metal-oxide semiconductor) image sensors. Nowadays, as imaging lenses for forming a subject image on those image sensors, lenses made of resin are used that can be mass-produced inexpensively and that thus contribute to cost reduction.

As such imaging lenses, in particular as imaging lenses used in imaging devices (so-called camera modules) incorporated in portable terminals, there are widely known those comprising three plastic lenses and those comprising one glass lens and two plastic lenses. Inconveniently, however, these imaging lenses do not promise easy compatibility between further size reduction and higher mass-producibility due to technical limitations.

As one measure to overcome this inconvenience, Patent Document 1 noted below deals with the replica method. The replica method is a method for forming a large number of lenses (lens elements) on a single lens substrate (wafer). A lens substrate (lens unit) including a plurality of lenses formed by this method arranged in an array is first joined to image sensors in the shape of a wafer (sensor wafer) and is then split. In the lens unit so split, the imaging lens corresponding to an imaging sensor is referred to as a wafer scale lens (cemented compound lens), and the module including the wafer scale lens and the imaging sensor is referred to as a wafer scale camera module.

Patent Document 1 discloses an imaging lens including a wafer scale lens (an optical element having a lens contiguous with at least one substrate surface of the lens substrate; also referred to as a lens block) formed by the replica method. Incidentally, in the wafer scale lens in this imaging lens, a diffractive surface and a refractive surface are formed simultaneously on a lens substrate, so that with those surfaces the imaging lens corrects chromatic aberration.

Patent Document 1: JP-A-2006-323365

DISCLOSURE OF THE INVENTION

Problems to be Solved by the Invention

However, forming a diffractive surface and a refractive surface simultaneously on a lens substrate, as in the imaging lens disclosed in Patent Document 1, is not easy. In particular, in a lens system with a comparatively short optical total length (the distance, in a lens system, from the most object-side incidence surface to the imaging surface of an imaging sensor), the refractive surface is extremely thin at its center, and this makes the formation of a wafer scale lens more difficult.

In an imaging lens including a diffractive surface, the diffraction efficiency with light of wavelengths other than the design wavelength tends to be low. In addition, if the diffractive surface has poor angular characteristics with the light incident on it, the angle of incidence of that light with respect to the diffractive surface is restricted, and thus the imaging lens cannot have a wide angle of view.

Moreover, even such a wafer scale lens needs to have optical performance comparable with that of a conventional, normal lens system (normal lens) formed of glass or resin. In a case where a wafer scale lens needs to include a meniscus shape from the viewpoint of optical performance, however, in order for the wafer scale lens to include a lens substrate, it needs to have an increased thickness along the optical axis. As a result, the wafer scale lens, and hence the imaging lens, tends to have an increased length.

Nowadays, a camera module, together with an IC chip, etc. is fitted on a printed circuit board having solder paste printed on it, and is then heated (for reflow soldering); thereby the module is mounted on it. Such mounting allows inexpensive mass-production of various devices including the camera module. Thus, recent imaging lenses need to be sufficiently heat-resistant to withstand reflow soldering.

The present invention has been made in view of the foregoing, and an object of the present invention is to provide an imaging lens etc. that help reduce the optical total length relative to the image height without including a diffractive surface or the like, despite including fewer lens blocks;

achieve satisfactory aberration correction; and reduce costs.

Means for Solving the Problem

An imaging lens includes: one or two lens blocks each including: a lens substrate that is a plane-parallel plate; and a lens contiguous with at least one of the object-side and image-side substrate surfaces of the lens substrate, the lens exerting a positive or negative optical power. The imaging lens also includes an aperture stop that restricts light amount.

The lens blocks included in the imaging lens are given numbers, namely first and second, according to their place in order from the object side to the image side. Likewise, the lens substrates included in the lens blocks are given numbers, namely first and second. The lenses L in the lens blocks are each referred to as the lens L on the object side (o) or image side (i) of a given lens substrate LS (either the first lens substrate LS1 or the second lens substrate LS2), specifically the lens L[LS1$o$], the lens L[LS1$m$], the lens L[LS2$o$], and the lens L[LS2$m$].

In the imaging lens constructed as described above, in each of the one or two lens blocks, the lens included therein is formed out of a material different from the material out of which the lens substrate is formed, and the one or two lens blocks include a first lens block disposed at the most object-side position, the first lens block exerting a positive optical power. The first lens block includes, as a lens substrate, a first lens substrate and, as a lens, a lens L[LS1$o$] contiguous with the object-side substrate surface of the first lens substrate. Moreover, in the imaging lens, conditional formula (C1) below is fulfilled.

$$0.1 < |N[LS1] - N[L[LS1o]]| \qquad (C1)$$

where
N[LS1] represents the index of refraction of the first lens substrate; and
N[L[LS1o]] represents the index of refraction of the lens L[LS1o].

Moreover, in the imaging lens, preferably, the object-side lens surface of the lens L[LS1o] is convex to the object side, and conditional formula (C2) below is fulfilled.

$$0.6 \leq f[L[LS1o]o]/f[\text{all}] \leq 2.0 \qquad (C2)$$

where
f[L[LS1o]o] represents the focal length of the object-side lens surface of the lens L[LS1o]; and
f[all] represents the focal length of the entire imaging lens.

Moreover, in the imaging lens, preferably, conditional formula (C3) below is fulfilled.

$$0.1 < N[LS1] - N[L[LS1o]] \qquad (C3)$$

where
N[LS1] represents the index of refraction of the first lens substrate; and
N[L[LS1o]] represents the index of refraction of the lens L[LS1o].

In the imaging lens LN, preferably conditional formula (C4) below is fulfilled.

$$\nu[LS1] < \nu[L[LS1o]] \qquad (C4)$$

where
$\nu$[LS1] represents the Abbe number of the first lens substrate; and
$\nu$[L[LS1o]] represents the Abbe number of the lens L[LS1o].

Preferably, the imaging lens is constructed as follows: the imaging lens includes the first lens block alone as a lens block, and the first lens block further includes, as a lens, a lens L[LS1m] contiguous with the image-side substrate surface of the first lens substrate, the image-side lens surface of the lens L[LS1m] being convex to the image side.

In such an imaging lens, preferably, the image-side lens surface of the lens L[LS1m] is an aspherical surface that is convex at its vertex and that is concave in its part where it intersects the principal ray with the maximum image height.

Preferably, the imaging lens is constructed as follows: the imaging lens includes the first lens block alone as a lens block, and the first lens block further includes, as a lens, a lens L[LS1m] contiguous with the image-side substrate surface of the first lens substrate, the image-side lens surface of the lens L[LS1m] being concave to the image side.

Preferably, the imaging lens includes only two lens blocks, namely the first lens block and a second lens block, and is constructed as follows. The first lens block further includes, as a lens, a lens L[LS1m] contiguous with the image-side substrate surface of the first lens substrate, the image-side lens surface of the lens L[LS1m] being convex to the image side.

In addition, the second lens block is located to the image side of the first lens block. The second lens block includes, as a lens substrate, a second lens substrate and, as lenses, a lens L[LS2o] contiguous with the object-side substrate surface of the second lens substrate and a lens L[LS2m] contiguous with the image-side substrate surface of the second lens substrate. Moreover, the object-side lens surface of the lens L[LS2o] is convex to the object side and aspherical, and the image-side lens surface of the lens L[LS2m] is aspherical.

In such an imaging lens including a first and a second lens block, preferably, the image-side lens surface of the lens L[LS1m] is convex at its vertex and is concave in its part where it intersects the principal ray with the maximum image height.

Preferably, the imaging lens includes only two lens blocks, namely the first lens block and a second lens block, and is constructed as follows. The first lens block further includes, as a lens, a lens L[LS1m] contiguous with the image-side substrate surface of the first lens substrate, the image-side lens surface of the lens L[LS1m] being concave to the image side.

In addition, the second lens block is located to the image side of the first lens block. The second lens block includes, as a lens substrate, a second lens substrate and, as lenses, a lens L[LS2o] contiguous with the object-side substrate surface of the second lens substrate and a lens L[LS2m] contiguous with the image-side substrate surface of the second lens substrate. Moreover, the object-side lens surface of the lens L[LS2o] is convex to the object side and aspherical, and the image-side lens surface of the lens L[LS2m] is aspherical.

In such an imaging lens including a first and a second lens block, preferably, the image-side lens surface of the lens L[LS1m] is convex at its vertex and is concave in its part where it intersects the principal ray with the maximum image height.

Preferably, the imaging lens includes only two lens blocks, namely the first lens block and a second lens block, and is constructed as follows. The first lens block further includes, as a lens, a lens L[LS1m] contiguous with the image-side substrate surface of the first lens substrate, the image-side lens surface of the lens L[LS1m] being concave to the image side.

In addition, the second lens block is located to the image side of the first lens block. The second lens block includes, as a lens substrate, a second lens substrate and, as lenses, a lens L[LS2o] contiguous with the object-side substrate surface of the second lens substrate and a lens L[LS2m] contiguous with the image-side substrate surface of the second lens substrate. Moreover, the object-side lens surface of the lens L[LS2o] is concave to the object side, and the image-side lens surface of the lens L[LS2m] is aspherical.

In such an imaging lens including a first and a second lens block, preferably, the image-side lens surface of the lens L[LS1m] is an aspherical surface that is convex at its vertex and that is concave in its part where it intersects the principal ray with the maximum image height.

Moreover, preferably, the imaging lens includes only two lens blocks, namely the first lens block and a second lens block, and is constructed as follows: the first lens block further includes, as a lens, a lens L[LS1m] contiguous with the image-side substrate surface of the first lens substrate, the image-side lens surface of the lens L[LS1m] being concave to the image side.

In addition, the second lens block is located to the image side of the first lens block and includes, as a lens substrate, a second lens substrate and, as lenses, a lens L[LS2o] contiguous with the object-side substrate surface of the second lens substrate and a lens L[LS2m] contiguous with the image-side substrate surface of the second lens substrate. Moreover, the object-side lens surface of the lens L[LS2o] is concave to the object, and the image side of the lens L[LS2m] is aspherical.

Preferably, the imaging lens is constructed as follows: the imaging lens includes the first lens block alone as a lens block, and the first lens block includes, as lenses, a lens L[LS1o] contiguous with the object-side substrate surface of the first lens substrate and a lens L[LS1m] contiguous with the image-side substrate surface of the first lens substrate. In the imaging lens, preferably, the object-side lens surface of the lens L[LS1o] is concave to the object side, and the image-side lens surface of the lens L[LS1m] is convex to the image side. Moreover, conditional formula (C5) below is fulfilled.

$$0.6 \leq f[L[LS1m]m]/f[\text{all}] \leq 2.0 \qquad (C5)$$

where
f[L[LS1m]m] represents the focal length of the image-side lens surface of the lens L[LS1m]; and
f[all] represents the focal length of the entire imaging lens.

In the imaging lens, preferably, conditional formula (C6) below is fulfilled.

$$0.03 \leq d[LS1]/TL \leq 0.34 \quad (C6)$$

where
d[LS1] represents the thickness of the first lens substrate along the optical axis; and
TL represents the distance from the most object-side surface in the imaging lens to the imaging surface along the optical axis.

In the imaging lens, preferably, conditional formula (C7) below is fulfilled.

$$Ar/TL \leq 0.5 \quad (C7)$$

where
Ar represents the sum of the aerial distances between adjacent lens blocks in the imaging lens (including the thickness of any optical device having no optical power other than a lens block, as given as an equivalent thickness in air); and
TL represents the distance from the most object-side surface in the imaging lens to the imaging surface along the optical axis.

In the imaging lens, preferably, a lens substrates is formed out of glass.

In the imaging lens, preferably, a lens is formed out of resin.

Preferably, the resin of which a lens is formed has inorganic fine particles with a particle diameter of 30 nm or less dispersed therein.

Preferably, the resin is a hardening resin.

It can be said that the present invention also covers an imaging device including: an imaging lens as described above; and an imaging sensor sensing the light passing through the imaging lens. The present invention also covers a portable terminal including such an imaging device.

A preferable method of manufacturing an imaging lens as described above includes, let a unit including, as a lens block, a plurality of lens blocks arranged in an array be called a lens unit block: a joining step of arranging a spacer at least at part of a peripheral edge of the lens blocks and joining the plurality of lens block units with the spacer in between; and a step of cutting the joined-together lens block units along the spacer.

ADVANTAGES OF THE INVENTION

According to the present invention, an imaging lens includes one or two lens blocks so as to be compact. In particular, a lens block disposed at the most object-side position exerts a positive optical power, and owing to the difference between the index of refraction of a lens substrate and the index of refraction of a lens L[LS1o] in that lens block, the chromatic aberration in the imaging lens is corrected properly. In addition, fabricating a large number of lenses simultaneously on a single plane-parallel plate makes production and assembly of the imaging lens easy, with the result that the imaging lens is manufactured inexpensively.

BRIEF DESCRIPTION OF DRAWINGS

[FIG. 9A] is a spherical aberration diagram showing the imaging lens of Example 1.
[FIG. 9B] is an astigmatism aberration diagram showing the imaging lens of Example 1.
[FIG. 9C] is a distortion diagram showing the imaging lens of Example 1.
[FIG. 10A] is a spherical aberration diagram showing the imaging lens of Example 2.
[FIG. 10B] is an astigmatism aberration diagram showing the imaging lens of Example 2.
[FIG. 10C] is a distortion diagram showing the imaging lens of Example 2.
[FIG. 11A] is a spherical aberration diagram showing the imaging lens of Example 3.
[FIG. 11B] is an astigmatism aberration diagram showing the imaging lens of Example 3.
[FIG. 11C] is a distortion diagram showing the imaging lens of Example 3.
[FIG. 12A] is a spherical aberration diagram showing the imaging lens of Example 4.
[FIG. 12B] is an astigmatism aberration diagram showing the imaging lens of Example 4.
[FIG. 12C] is a distortion diagram showing the imaging lens of Example 4.
[FIG. 13A] is a spherical aberration diagram showing the imaging lens of Example 5.
[FIG. 13B] is an astigmatism aberration diagram showing the imaging lens of Example 5.
[FIG. 13C] is a distortion diagram showing the imaging lens of Example 5.
[FIG. 14A] is a spherical aberration diagram showing the imaging lens of Example 6.
[FIG. 14B] is an astigmatism aberration diagram showing the imaging lens of Example 6.
[FIG. 14C] is a distortion diagram showing the imaging lens of Example 6.
[FIG. 15A] is a spherical aberration diagram showing the imaging lens of Example 7.
[FIG. 15B] is an astigmatism aberration diagram showing the imaging lens of Example 7.
[FIG. 15C] is a distortion diagram showing the imaging lens of Example 7.
[FIG. 16A] is a spherical aberration diagram showing the imaging lens of Example 8.
[FIG. 16B] is an astigmatism aberration diagram showing the imaging lens of Example 8.
[FIG. 16C] is a distortion diagram showing the imaging lens of Example 8.

LIST OF REFERENCE SYMBOLS

BK Lens block
L Lens
LS Lens surface
ape Aperture stop
s Lens surface or substrate surface
* Aspherical surface
PT Plane-parallel plate
LN Imaging lens
SR Imaging sensor
IM Image surface (optical image)
SS Light receiving surface
AX Optical axis
LU Imaging device
CU Portable terminal
1 Signal processor
2 Controller
3 Memory
4 Operated portion
5 Display portion

BEST MODE FOR CARRYING OUT THE INVENTION

Embodiment 1

[■ Imaging Device and Portable Terminal]

Typically, imaging lenses are suitably used in digital appliances (for example, portable terminals) equipped with an image capturing capability. This is because a digital appliance including a combination of an imaging lens, an image sensor, etc. functions as an imaging device that optically takes in an image of a subject and outputs it in the form of an electrical signal.

An imaging device is a main component (optical device) of a camera that shoots still and moving images of a subject, and includes, for example, from the object (i.e. subject) side thereof, an imaging lens that forms an optical image of an object and an image sensor that converts the optical image formed by the imaging lens into an electrical signal.

Examples of cameras include digital cameras, video cameras, monitoring cameras, vehicle-mounted cameras, and videophone cameras. Cameras may also be incorporated in, or externally fitted to, personal computers, portable terminals (for example, compact, portable information appliance terminals such as cellular phones and mobile computers), peripheral appliances (scanners, printers, etc.) for those and other digital appliances.

As these examples suggest, incorporation of an imaging device is not limited to building of cameras; incorporation of an imaging device allows building of a variety of appliances equipped with camera capabilities, for example building of digital appliances equipped with an image capturing capability, such as camera phones.

Figure 17:
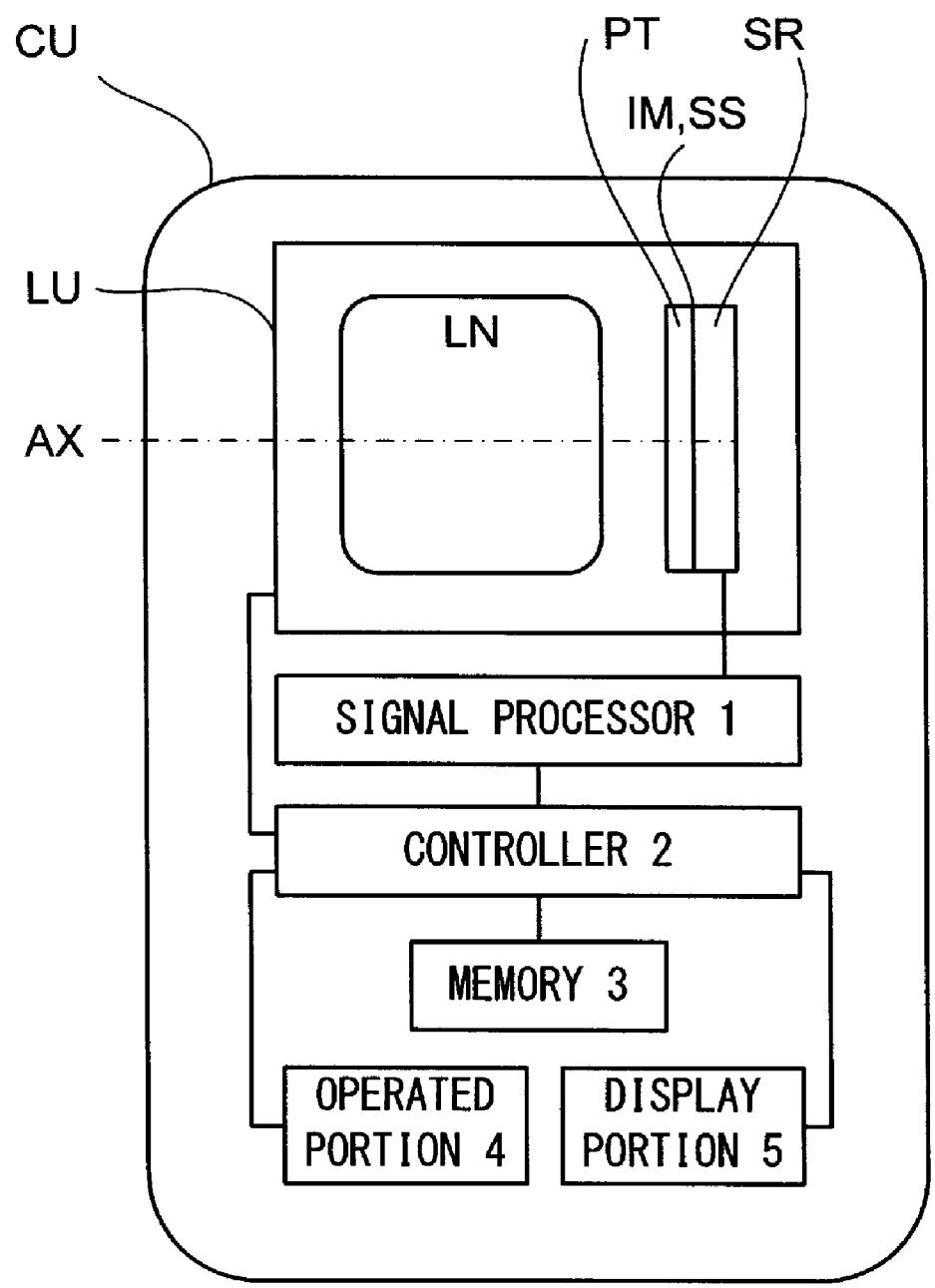
[FIG. 17] is a block diagram showing a portable terminal
[FIG. 18A] is a sectional diagram showing a lens block unit.

FIG. 17 is a block diagram of a portable terminal CU as one example of a digital appliance equipped with an image capturing capability. The portable terminal CU shown in this figure incorporates an imaging device LU, which includes an imaging lens LN, a plane-parallel plate PT, and an image sensor SR.

The imaging lens LN forms, from the object (i.e. subject) side thereof, an optical image (image surface) IM of an object. More specifically, the imaging lens LN includes, for example, a lens block BK (which will be described in detail later), and forms the optical image IM on a sensing surface SS of the image sensor SR.

Here, the optical image IM to be formed by the imaging lens LN passes through, for example, an optical low-pass filter (in FIG. 17, the plane-parallel plate PT) having a predetermined cut-off frequency characteristic determined by the pixel pitch of the image sensor SR. While passing there the optical image IM has its spatial frequency characteristic adjusted so as to minimize the so-called aliasing noise occurring when it is converted into an electrical signal.

The adjustment of the spatial frequency characteristic here helps reduce color moiré. In cases where the performance expected around the resolution limit frequency is modest, however, no noise occurs even without use of an optical low-pass filter. Likewise, in cases where a user shoots or watches images by use of a display system (for example, the liquid crystal display of a cellular phone, etc.) on which noise is less noticeable, there is no need for an optical low-pass filter.

The plane-parallel plate PT is one or more optical filters, such as an optical low-pass filter and an infrared cut filter, that are arranged as necessary (the plane-parallel plate PT may correspond to the cover glass or the like of the image sensor SR).

The image sensor SR converts the optical image IM formed on the sensing surface SS by the imaging lens LN into an electrical signal. Used here is, for example, an image sensor (solid-state image sensor), such as a CCD (charge-coupled device) image sensor or CMOS (complementary metal-oxide semiconductor) image sensor. The imaging lens LN is so located as to form the optical image IM of the subject on the sensing surface SS of the image sensor SR. Thus, the optical image IM formed by the imaging lens LN is efficiently converted into an electrical signal by the image sensor SR.

When an imaging device LU like this is incorporated in a portable terminal CU equipped with an image capturing capability, the imaging device LU is typically arranged inside the body of the portable terminal CU. When the camera capabilities of the portable terminal CU are used, the imaging device LU is brought into a desired state. For example, an imaging device LU provided as a unit may be designed to be detachable from, or freely rotatable relative to, the main unit of a portable terminal CU.

The portable terminal CU includes, in addition to the imaging device LU, a signal processor 1, a controller 2, a memory 3, an operated portion 4, and a display portion 5.

The signal processor 1 subjects the signal generated by the image sensor SR to predetermined digital image processing and image compression processing as necessary. The so processed signal is then recorded, as a digital video signal, to the memory 3 (a semiconductor memory, optical disk, or the like), and/or is transferred to an external device across a cable or after being converted into an infrared signal.

The controller 2 is a microcomputer, and governs, in a concentrated fashion, functional control for shooting and playing back images, etc., more specifically for controlling a lens movement mechanism for focusing, etc. For example, the controller 2 controls the imaging device LU to shoot at least either a still or a moving image of the subject.

The memory 3 stores, for example, the signal generated by the image sensor SR and then processed by the signal processor 1.

The operated portion 4 includes operated members such as operation buttons (for example, a shutter-release button) and an operation dial (for example, an operation mode dial), and transmits the information entered by an operator to the controller 2.

The display portion 5 includes a display such as a liquid crystal monitor, and displays images by use of the image signal resulting from the conversion by the image sensor SR, or by use of image information recorded in the memory 3.

[■ Imaging Lens]

Figure 1:
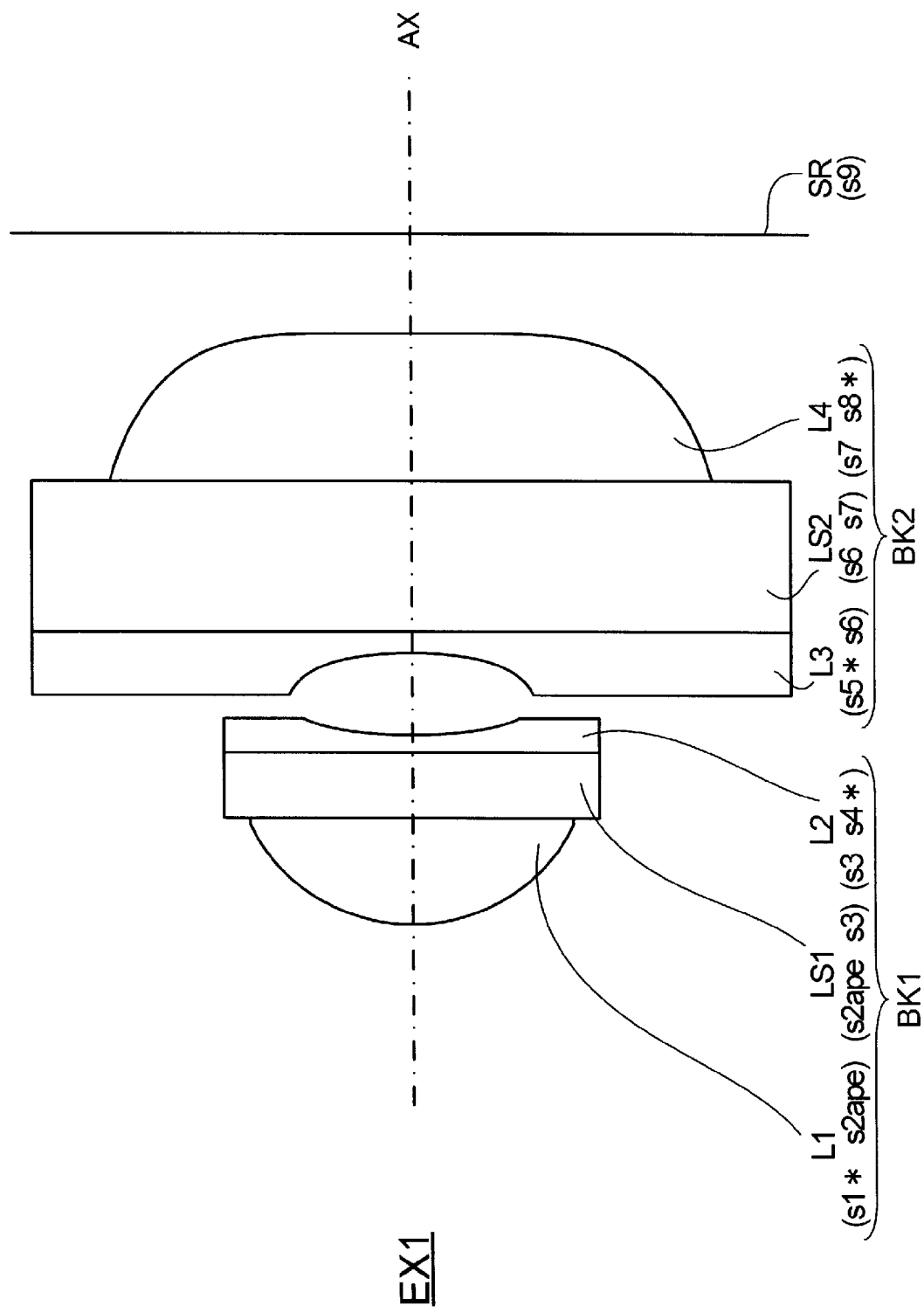
[FIG. 1] is an optical sectional diagram showing an imaging lens of Example 1 of the invention.
Figure 2:
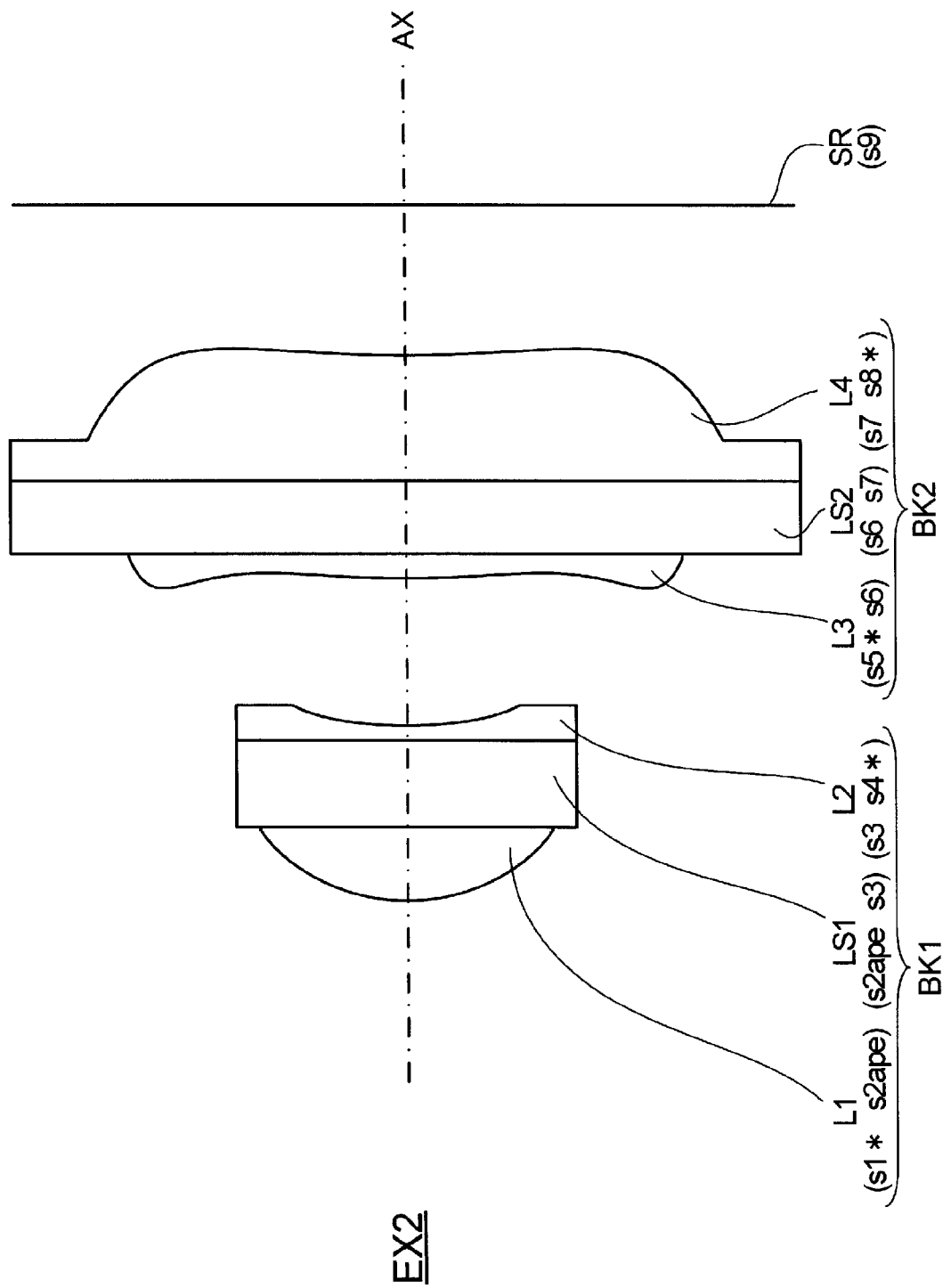
[FIG. 2] is an optical sectional diagram showing an imaging lens of Example 2.
Figure 3:
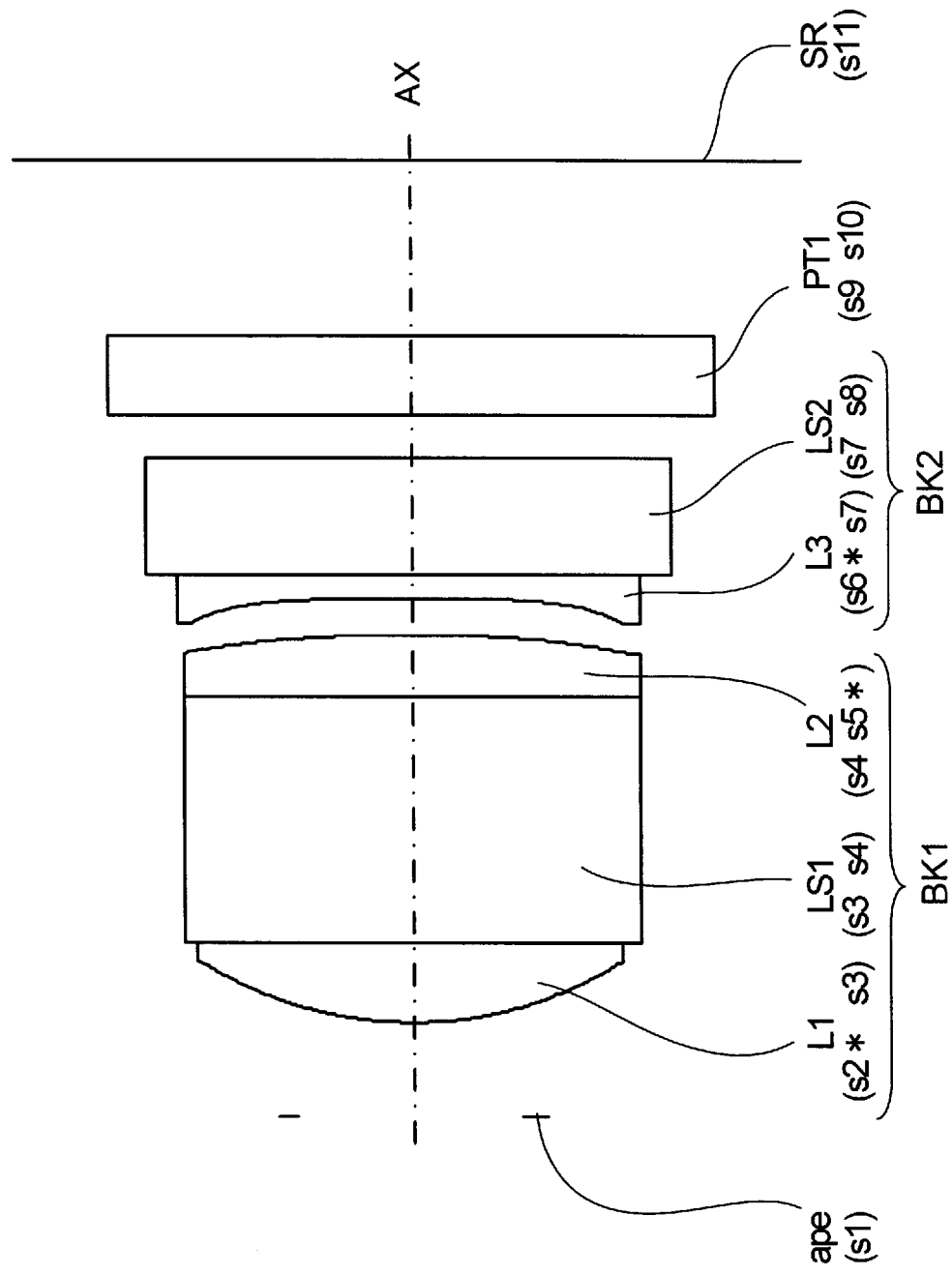
[FIG. 3] is an optical sectional diagram showing an imaging lens of Example 3.
Figure 4:
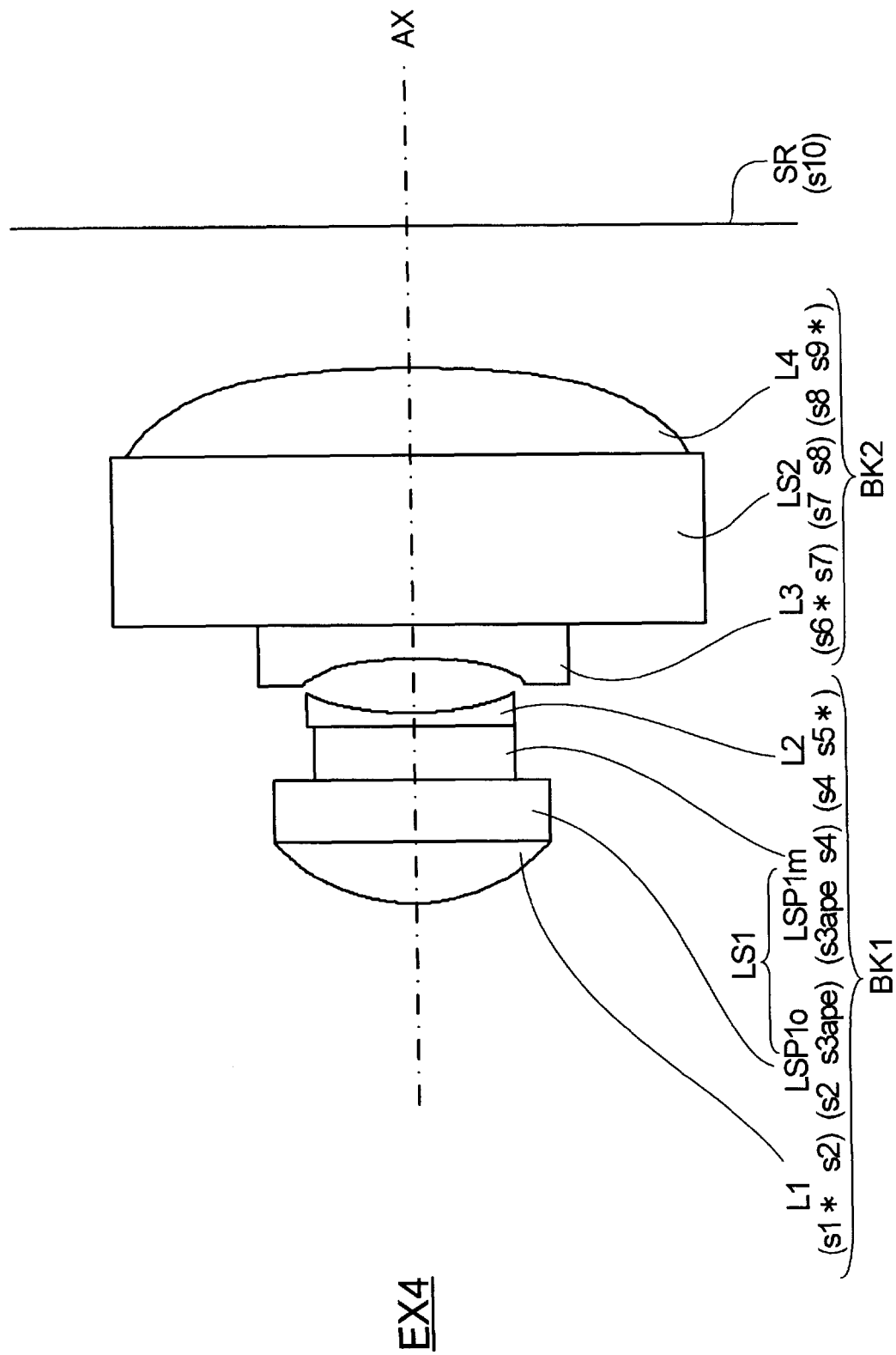
[FIG. 4] is an optical sectional diagram showing an imaging lens of Example 4.
Figure 5:
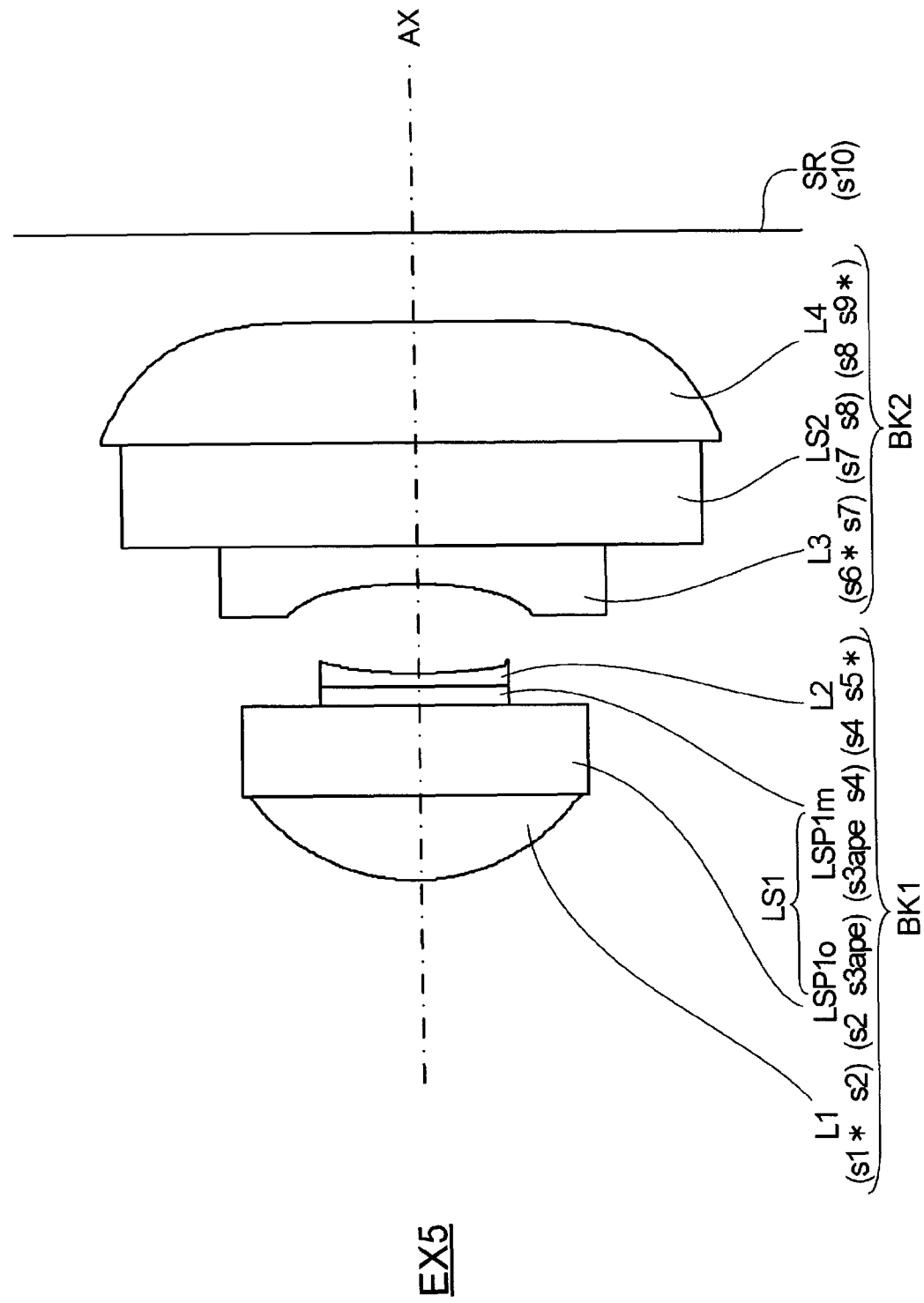
[FIG. 5] is an optical sectional diagram showing an imaging lens of Example 5.
Figure 6:
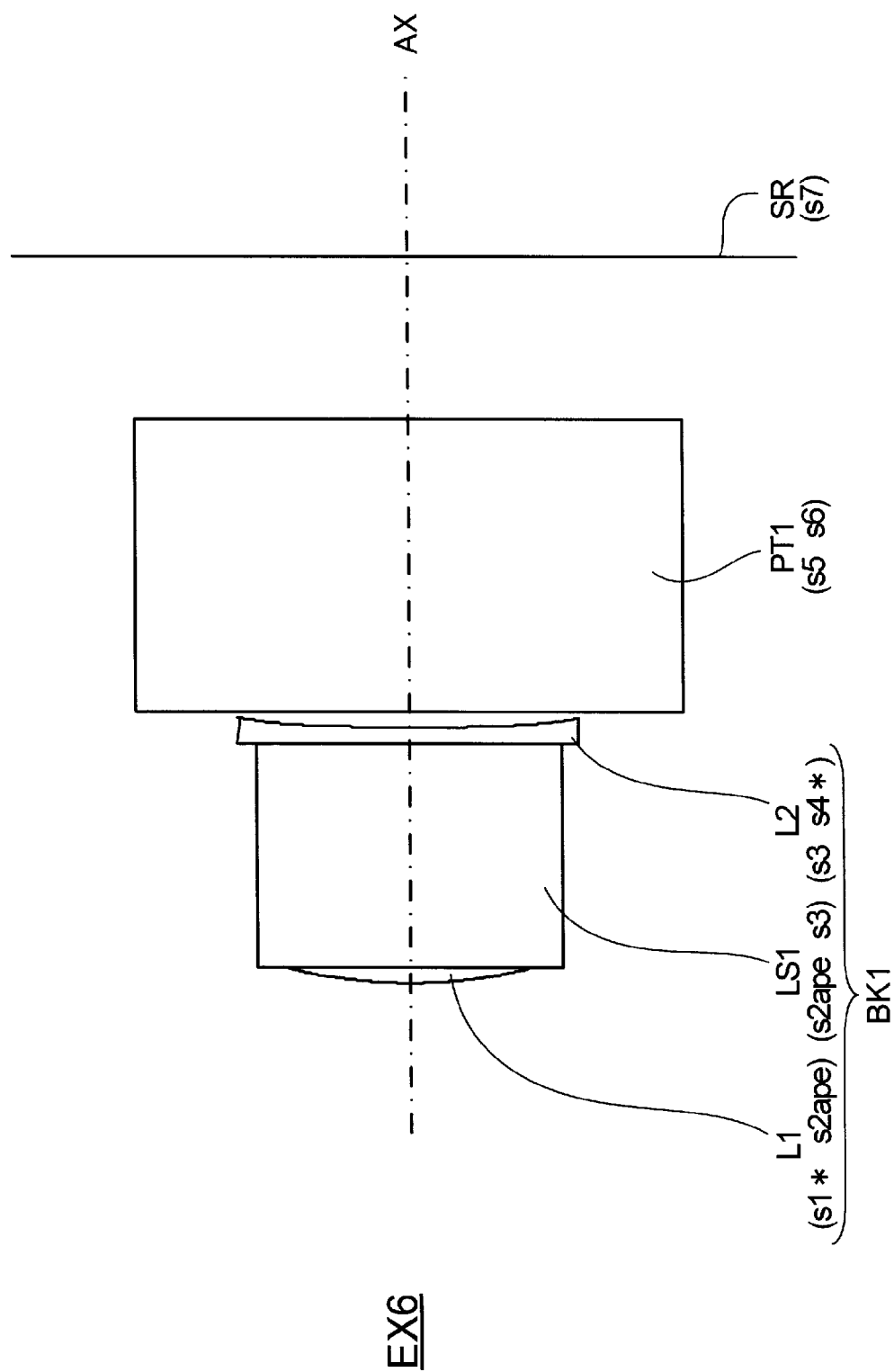
[FIG. 6] is an optical sectional diagram showing an imaging lens of Example 6.
Figure 7:
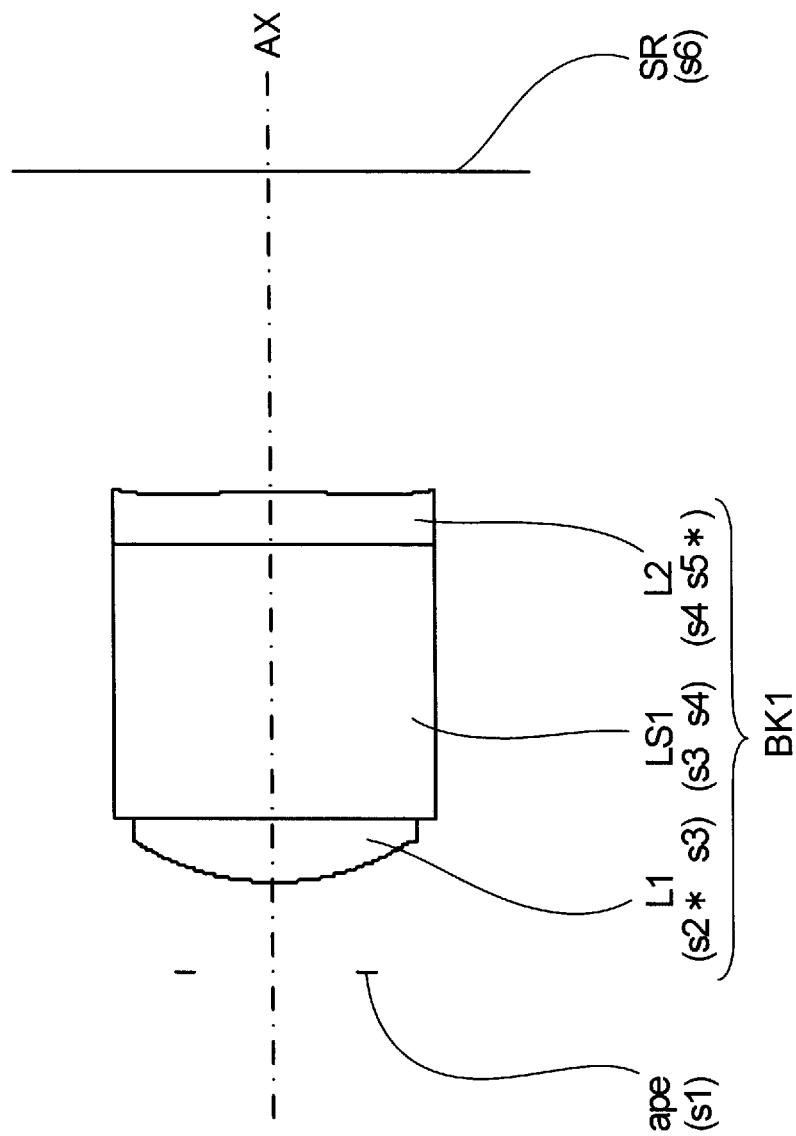
[FIG. 7] is an optical sectional diagram showing an imaging lens of Example 7.
Figure 8:
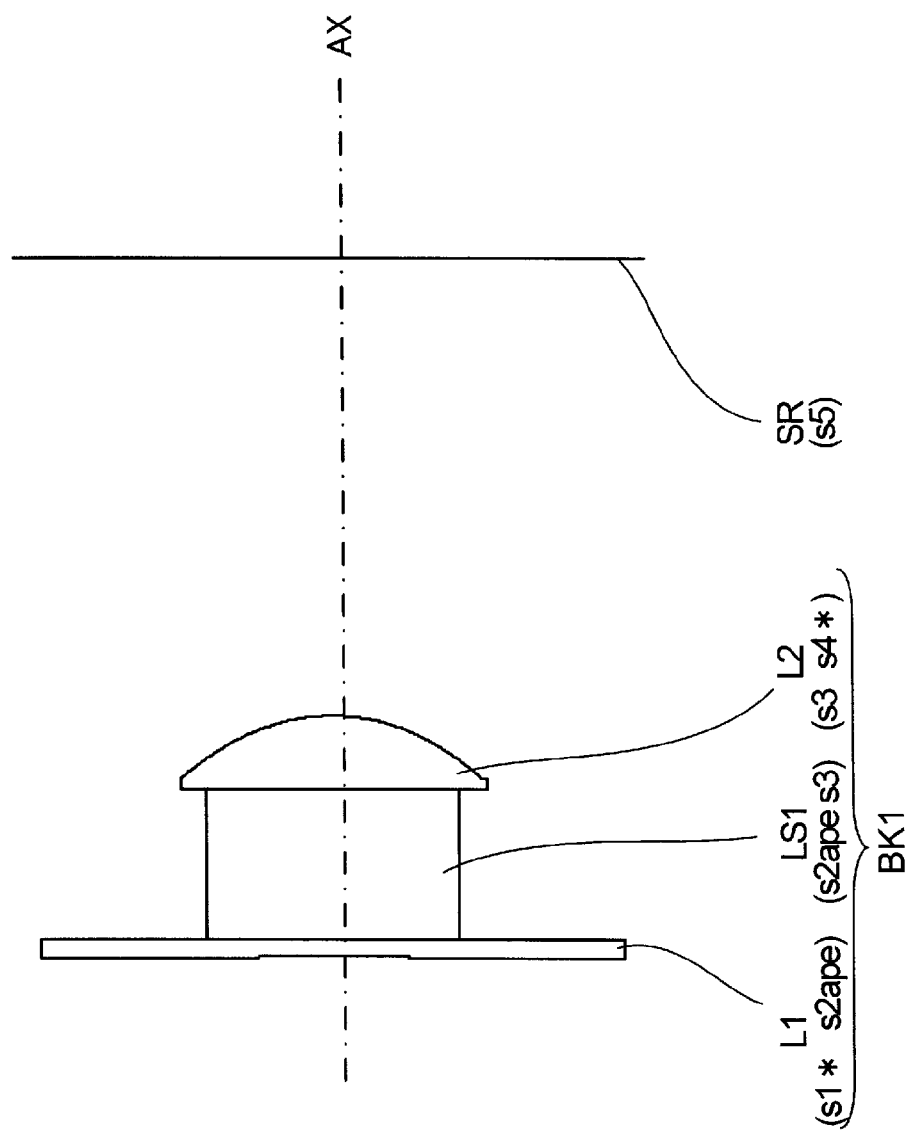
[FIG. 8] is an optical sectional diagram showing an imaging lens of Example 8.

Now, the imaging lens LN will be described in detail. The imaging lens LN includes a lens block BK having a plurality of optical elements that are contiguous with one another (see FIG. 1, which will be described later). This lens block (cemented compound lens) BK has a lens L contiguous with at least one of two opposite (object-side and image-side) substrate surfaces of a lens substrate LS (and the lens L exerts a positive or negative optical power).

Here, "contiguous with" denotes that the relevant substrate surface of the lens substrate LS and the lens L are directly bonded together, or are indirectly bonded together with another member in between.

[■ Manufacturing Method of an Imaging Lens]

Figure 18A:
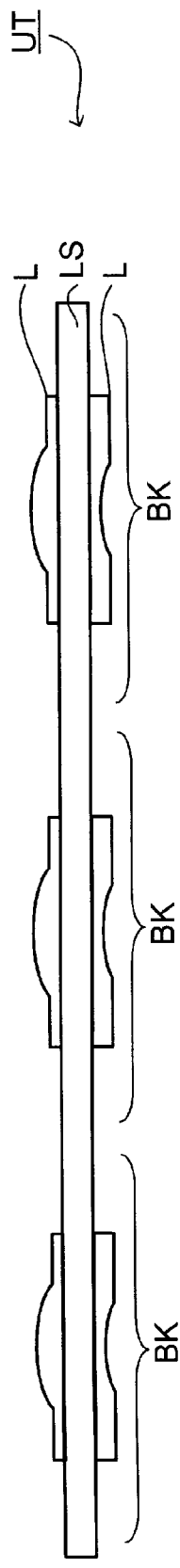
[FIG. 18B] is a sectional diagram illustrating a process of fabricating the imaging lens.
[FIG. 18C] is a sectional diagram showing the imaging lens.

A lens block unit UT, like the one shown in a sectional view in FIG. 18A, including a plurality of lens blocks BK arranged in an array allows simultaneous fabrication of a large number of lenses L, and is manufactured inexpensively by the reflow method or by the replica method (a lens block unit UT may include one lens block BK, or may include a plurality of lens blocks BK).

According to the reflow method, a film of low-softening-point glass is formed on a glass substrate by CVD (chemical vapor deposition). The low-softening-point glass film so formed is then subjected to microprocessing by lithography and dry etching. It is then heated, so that the low-softening-point glass film melts into the shape of lenses. Thus, by the reflow method, a large number of lenses are fabricated simultaneously on a glass substrate.

On the other hand, according to the replica method, a hardening resin is molded into the shape of lenses by use of a mold and is transferred onto a lens wafer. Thus, by the replica method, a large number of lenses are fabricated simultaneously on a lens wafer.

Then, from lens block units UT manufactured by a method like those described above, the imaging lens LN is manufactured. An example of the manufacturing process of the imaging lens LN is shown in a schematic cross-sectional view in FIG. 18B.

A first lens block unit UT1 is composed of a first lens substrate LS1 in the form of a plane-parallel plate, a plurality of first lenses L1 bonded to one surface of the first lens substrate LS1, and a plurality of second lenses L2 bonded to the other surface of the first lens substrate LS1.

A second lens block unit UT2 is composed of a second lens substrate LS2 in the form of a plane-parallel plate, a plurality of third lenses L3 bonded to one surface of the second lens substrate LS2, and a plurality of fourth lenses L4 bonded to the other surface of the second lens substrate LS2.

A spacer member (spacer) B1 in the shape of a lattice is interposed between the first and second lens block units UT1 and UT2 (specifically, between the first and second lens substrates LS1 and LS2) to keep constant the interval between the two lens block units UT1 and UT2. Another spacer member B1 is interposed between a substrate 2 and the second lens block unit 2 to keep constant the interval between the substrate 2 and the lens block unit UT2 (thus the spacer members B1 can be said to form a two-tier lattice). The lenses L are located in the eyes of the lattice of the spacer members B1.

The substrate B2 is a sensor chip package of a wafer scale including a microlens array, or a plane-parallel plate (corresponding to the plane-parallel plate PT in FIG. 17) such as a sensor cover glass or IR-cut filter.

Owing to the spacer members B1 being interposed between the first lens block unit UT1 and the first lens block unit UT2 and between the second lens block unit UT2 and the second substrate B2, the lens substrates LS (the first and second lens substrates LS1 and LS2) are sealed together to be integrated into a unit.

Figure 18B:
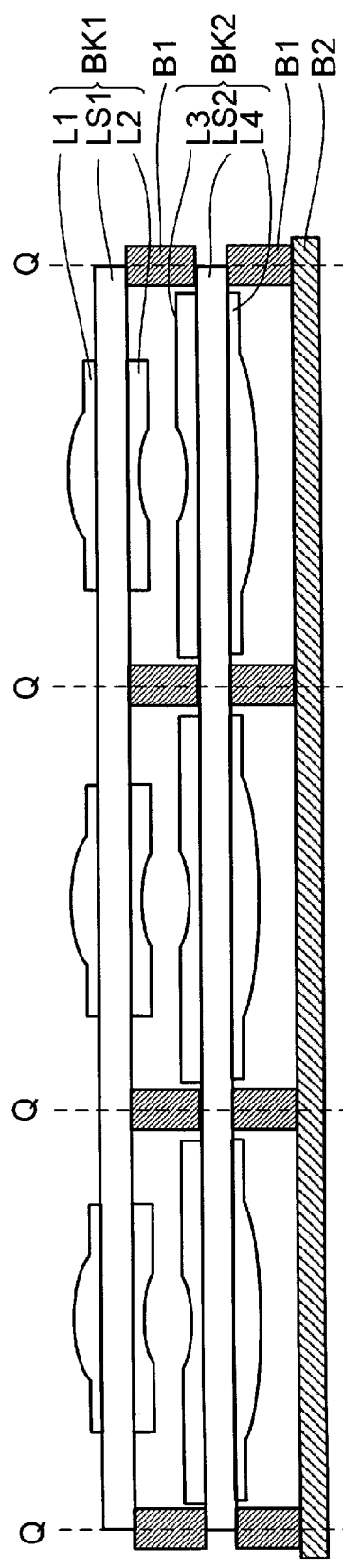
Figure 18C:
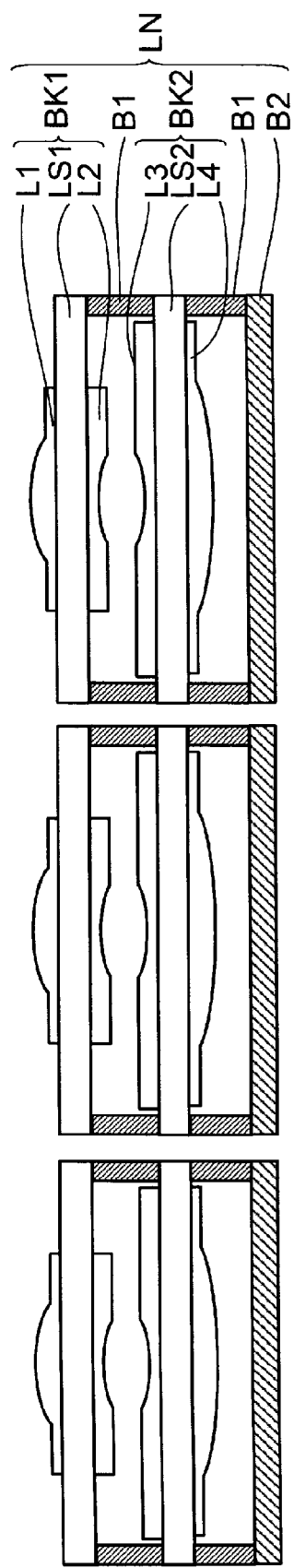

The first lens substrate LS1, the second lens substrate LS2, the spacer members B1, and the substrate 2 thus integrated into a unit are then cut along the lattice frame of the spacer members B1 (at the positions indicated by the broken lines Q); this produces a plurality of imaging lenses LN of a two-element construction as shown in FIG. 18C.

Manufacturing the imaging lens LN by cutting apart a member having a plurality of lens blocks BK (a first lens block BK1 and a second lens block BK2) built into it as described above eliminates the need for lens interval adjustment and assembly with each individual imaging lens LN. This makes it possible to mass-produce the imaging lens LN.

In addition, the spacer members B1 have the shape of a lattice. They thus serve as a guide that helps cut apart the imaging lens LN from the member having a plurality of lens blocks BK built into it. The imaging lens LN can thus be cut apart easily, without much time and trouble, from the member having a plurality of lens blocks BK built into it. This makes it possible to mass-produce the imaging lens inexpensively.

In light of the foregoing, the manufacturing method of the imaging lens LN includes a joining step in which a spacer member B1 is arranged at least at part of the peripheral edge of lens blocks BK and a plurality of lens block units UT are joined together with the spacer members B1 in between, and a cutting step in which the lens block units UT now joined together are cut apart along the spacer members B1. A manufacturing method like this is suitable for mass-production of inexpensive lens system.

[■ Lens Construction of the Imaging Lens]

Next, the lens construction of the imaging lens LN in different practical examples, namely Examples (EX) 1 to 8 will be described with reference to optical sectional diagrams in FIGS. 1 to 8.

The symbols used to identify the relevant members in optical sectional diagrams, etc. are as follows:

Li represents a lens L;

LSi represents a lens substrate LS (in all practical examples, the lens substrate LS is a plane-parallel plate);

BKi represents a lens block;

PTi represents a plane-parallel plate (use of this symbol is limited to a plane-parallel plate with which no lens L is contiguous);

si represents a lens surface or substrate surface;

i is a number suffixed as in "Li" to represent the place in order, among the members of the same kind, as counted from the object side to the image side;

* indicates an aspherical surface (a surface not adjoining a lens substrate LS but making contact with air is an aspherical surface);

ape represents an aperture stop; and

AX represents the optical axis.

A lens L suffixed with a number representing its place in order as counted from the object side to the image side may also be identified by an alternative expression. Specifically, with respect to a lens substrate LS (a first lens substrate LS1 or a second lens substrate LS2), a lens on the object side (o) thereof and a lens on the image side (m) thereof may alternatively be identified as a lens L[LS1o] and a lens L[LS1m], and a lens L[LS2o] and a lens L[LS2m], respectively.

●EXAMPLE 1

In Example 1, the imaging lens LN includes two lens blocks BK1 and BK2 disposed in this order from the object side to the image side, and also includes an aperture stop ape.

The first lens block BK1 disposed at the most object-side position includes a first lens substrate LS1. A first lens L1 (lens L[LS1o]) is contiguous with the object-side substrate surface of the first lens substrate LS1, and a second lens L2 (lens L[LS1m]) is contiguous with the image-side substrate surface of the first lens substrate LS1. Specifically, the first lens L1 and the second lens L2 are configured as noted below. The aperture stop ape is formed at the boundary surface between the first lens L1 and the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

The second lens block BK2 is located to the image side of the first lens block BK1, and includes a second lens substrate LS2. A third lens L3 (lens L[LS2o]) is contiguous with the object-side substrate surface of the second lens substrate LS2, and a fourth lens L4 (lens L[LS2m]) is contiguous with the image-side substrate surface of the second lens substrate LS2. Specifically, the third and fourth lenses L3 and L4 are configured as noted below.

The 3rd lens L3 is a plano-concave lens concave to the object side (its object-side lens surface being an aspherical surface); and The 4th lens L4 is a plano-concave lens concave to the image side (its image-side lens surface being an aspherical surface).

●EXAMPLE 2

In Example 2, the imaging lens LN includes a first lens block BK1, a second lens block BK2, and an aperture stop ape.

In the first lens block BK1, a first lens L1 (lens L[LS1o]) contiguous with the object-side substrate surface of the first lens substrate LS1 and a second lens L2 (lens L[LS1m]) contiguous with the image-side substrate surface of the first lens substrate LS1 are configured as noted below. The aperture stop ape is formed at the boundary surface between the first lens L1 and the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

In the second lens block BK2, a third lens L3 (lens L[LS2o]) contiguous with the object-side substrate surface of the second lens substrate and a fourth lens L4 (lens L[LS2m]) contiguous with the image-side substrate surface of the second lens substrate LS2 are configured as noted below.

The 3rd lens L3 is a plano-convex lens convex to the object side (its object-side lens surface being an aspherical surface that is convex at its vertex and that is concave in its part where it intersects the principal ray with the maximum image height); and The 4th lens L4 is a plano-concave lens concave to the image side (its image-side lens surface being an aspherical surface).

●EXAMPLE 3

In Example 3, the imaging lens LN includes a first and a second lens block BK1 and BK2, and also includes a plane-parallel plate PT1 located to the image-side of the second lens block BK2 (needless to say, it also includes an aperture stop ape). That is, here, the imaging lens LN includes the first and second lens blocks BK1 and BK2 alone as lens blocks BK (optical devices having an optical power). The aperture stop ape is located to the object side of the first lens block BK1 (the aperture stop ape too is identified by a surface symbol, namely "s1").

In the first lens block BK1, a first lens L1 (lens L[LS1o]) contiguous with the object-side substrate surface of the first lens substrate and a second lens L2 (lens L[LS1m]) contiguous with the image-side substrate surface of the first lens substrate LS1 are configured as noted below.

The 1st lens L1 is a plano-convex lens convex to the object-side (its object-side lens surface being an aspherical surface); and The 2nd lens L2 is a plano-convex lens convex to the image side (its image-side lens surface being an aspherical surface).

The second lens block BK2 includes a second lens substrate LS2, and, only with the object-side substrate surface of the second lens substrate LS2, a lens L (a third lens L3 (lens L[LS2o])) contiguous. Specifically, the third lens L3 is configured as noted below.

The 3rd lens L3 is a plano-concave lens concave to the object side (its object-side lens surface being an aspherical surface).

●EXAMPLE 4

In Example 4, the imaging lens LN includes a first and a second lens block BK1 and BK2, and an aperture stop ape. What is particular about this imaging lens LN, as distinct from the imaging lenses LN of Examples 1 to 3, is that it includes a lens substrate LS in which lens substrate pieces LSP and LSP are contiguous with each other.

The first lens block BK1 includes a first lens substrate LS1. The first lens substrate LS1 is formed by joining together (such as by cementing together) a lens substrate piece LSP1o located on the object side and a lens substrate piece LSP1m located on the image side. Even with such a first lens substrate LS1, both its, object-side and image-side, substrate surfaces (the object-side substrate surface of the lens substrate piece LSP1o and the image-side substrate surface of the lens substrate piece LSP1m) are planar. Thus, the first lens substrate LS1 is a plane-parallel plate.

A first lens L1 (lens L[LS1o]) is contiguous with the object-side substrate surface of the first lens substrate LS1, and a second lens L2 (lens L[Ls1m]) is contiguous with the image-side substrate surface of the first lens substrate LS1. Specifically, the first and second lenses L1 and L2 are configured as noted below. The aperture stop ape is formed at the boundary surface between the lens substrate pieces LSP1o and LSP1m in the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

In the second lens block BK2, a third lens L3 (lens L[LS2o]) contiguous with the object-side substrate surface of the second substrate LS2 and a fourth lens L4 (lens L[Ls2m]) contiguous with the image-side substrate surface of the second substrate LS2 are configured as noted below.

The 3rd lens L3 is a plano-concave lens convex to the object side (its object-side lens surface being an aspherical surface); and The 4th lens L4 is a plano-convex lens concave to the image side (its image-side lens surface being an aspherical surface).

●EXAMPLE 5

In Example 5, the imaging lens LN includes a first lens substrate LS1 in which lens substrate pieces LSP1o and LSP1m are contiguous with each other. The imaging lens LN further includes a first and a second lens block BK1 and BK2, and an aperture stop ape.

In the first lens block BK1, a first lens L1 (lens L[LS1o]) contiguous with the object-side substrate surface of the first lens substrate LS1 and a second lens L2 (lens L[LS1m]) contiguous with the image-side substrate surface of the first lens substrate LS1 are configured as noted below. The aperture stop ape is formed at the boundary surface between the lens substrate pieces LSP1o and LSP1m in the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

In the second lens block BK2, a third lens L3 (lens L[LS2o]) contiguous with the object-side substrate surface of the second lens substrate LS2 and a fourth lens L4 (lens L[LS2m]) contiguous with the image-side substrate surface of the second lens substrate LS2 are configured as noted below.

The 3rd lens L3 is a plano-concave lens concave to the object side (its object-side lens surface being an aspherical surface); and The fourth lens L4 is a plano-concave lens concave to the image side (its image-side lens surface being an aspherical surface).

●EXAMPLE 6

In Example 6, the imaging lens LN includes a first lens block BK1 and a plane-parallel plate 1 located to the image side of the first lens block BK1 (needless to say, it also includes an aperture stop ape). That is, here, the imaging lens LN includes the first lens block BK1 alone as a lens block BK.

In the first lens block BK1, a first lens L1 (lens L[LS1o]) contiguous with the object-side substrate surface of the first lens substrate LS1 and a second lens L2 (lens L[LS1m]) contiguous with the image-side substrate surface of the first lens substrate LS1 are configured as noted below. The aperture stop ape is formed at the boundary surface between the first lens L1 and the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

●EXAMPLE 7

In Example 7, the imaging lens LN includes a first lens block BK1 alone as a lens block BK, and also includes an aperture stop ape. The aperture stop ape is located to the object side of the first lens block BK1.

In the first lens block BK1, a first lens L1 (lens L[LS1o]) contiguous with the object-side substrate surface of the first lens substrate LS1 and a second lens L2 (lens L[LS1m]) contiguous with the image-side substrate surface of the first lens substrate LS1 are configured as noted below.

The 1st lens L1 is a plano-convex lens convex to the object side (its object-side lens surface being an aspherical surface); and The 2nd lens L2 is a plano-convex lens convex to the image side (its image-side lens surface being an aspherical surface that is convex at its vertex and that is concave in its part where it intersects the principal ray with the maximum image height).

●EXAMPLE 8

In Example 8, the imaging lens LN includes a first lens block BK1 alone as a lens block BK (needless to say, it also includes an aperture stop ape). The aperture stop ape is formed at the boundary surface between a first lens L1 and the first lens substrate LS1.

In the first lens block BK1, a first lens L1 (lens L[LS1o]) contiguous with the object-side substrate surface of the first lens substrate LS1 and a second lens L2 (lens L[LS1m]) contiguous with the image-side substrate surface of the first lens substrate LS1 are configured as noted below.

The 1st lens L1 is a plano-concave lens concave to the object side (its object-side lens surface being an aspherical surface); and The 2nd lens L2 is a plano-convex lens convex to the image side (its image-side lens surface being an aspherical surface).

[■ Lens Data of the Imaging Lens]

Next, with respect to the imaging lenses LN of Examples (EX) 1 to 8, their respective general data, construction data, and aspherical surface data will be presented in tables.

The symbols used to present general data are as follows:

f represents the focal length (in the unit of mm);

Fno represents the f-number;

BF represents the back-focal length (given as an equivalent length in air, which applies also to the back-focal length included in the optical total length of the imaging lens LN);

Y' represents the image height (in the unit of mm; with distortion disregarded);

ω represents the half angle of view (in the unit of degrees; with distortion taken into consideration); and TL represents the total length of the imaging lens LN (in the unit of mm).

With respect to a lens L contiguous with the object-side substrate surface of a lens substrate LS, its focal length is calculated on the assumption that air is present on the object side of that lens L and that the medium of the lens substrate LS is present on the image side of the lens L. With respect to a lens L contiguous with the image-side substrate surface of the lens substrate LS, its focal length is calculated on the assumption that the medium of the lens substrate LS is present on the object side of that lens L and that air is present on the image side of the lens L.

With respect to the object-side lens surface of an uncemented lens L, its focal length is calculated on the assumption that air is present on the object side of the lens L and that the medium of the lens substrate LS is present on the image side of the lens L. Needless to say, with respect to the image-side lens surface of the lens L, its focal length is calculated on the assumption that the medium of the lens substrate LS is present on the object side of the lens L and that air is present on the image side of the image side of the lens L.

The symbols used to present the construction data are as follows:
- si represents a lens surface or substrate surface, with the suffixed number representing its place in order as counted from the object side to the image side;
- i is a number suffixed as in "si" to represent the place in order as counted from the object side to the image side;
- * indicates an aspherical surface;
- ape represents an aperture stop;
- r represents a radius of curvature (in the unit of mm) of a lens surface or a substrate surface;
- d represents an axial surface-to-surface distance (in the unit of mm);
- Nd represents the index of refraction of a medium for d-line (with a wavelength of 587.56 nm); and
- vd represents the Abbe number of a medium for d-line.

Aspherical data is defined by the formula (AS) below employing the local orthogonal coordinate system (x, y, z) having its origin at the vertex of an aspherical surface. Presented for each relevant surface (si) are the values of K and A to I below (wherever A to I are zero, they are omitted); for all these values, "E-n" stands for "$\times 10^{-n}$".

$$z=(c\cdot\rho^2)/[1+\sqrt{1-(1+K)\cdot c^2\cdot\rho^2}]+A\cdot\rho^4+B\cdot\rho^6+C\cdot\rho^8+D\cdot\rho^{10}+E\cdot\rho^{12}+F\cdot\rho^{14}+G\cdot\rho^{16}+H\cdot\rho^{18}+I\cdot\rho^{20} \quad (AS)$$

where
- ρ represents the height in a direction perpendicular to the z-axis (the optical axis AX) ($\rho^2=x^2+y^2$);
- z represent the amount of sag in the optical axis AX direction at the height ρ (relative to the vertex);
- c represents the curvature (the reciprocal of the radius of curvature r) at the vertex;
- K represents the conical constant; and
- A to I represents the aspherical surface coefficients of orders 4, 6, 10, 12, 14, 16, 18, and 20, respectively.

●EXAMPLE 1

TABLE 1

| EXAMPLE 1 | | | | | | | |
|---|---|---|---|---|---|---|---|
| f [mm] 2.964 | | Fno 2.8 | | | BF [mm] 0.4625 | | |
| Y' [mm] 1.750 | | ω [°] 30.56 | | | TL [mm] 3.179 | | |
| si | i | r [mm] | i | d [mm] | i | Nd | vd | Element |
| s1 | * | 1 | 0.808 | | | | | L1 BK1 |
| | | | | 1 | 0.489 | 1 | 1.5071 | 54.00 |
| s2 | ape | 2 | ∞ | | | | | |
| | | | | 2 | 0.300 | 2 | 1.6492 | 29.92 LS1 |
| s3 | | 3 | ∞ | | | | | |
| | | | | 3 | 0.080 | 3 | 1.5737 | 29.00 L2 |

TABLE 1-continued

| EXAMPLE 1 | | | | | | | |
|---|---|---|---|---|---|---|---|
| f [mm] 2.964 | | Fno 2.8 | | | BF [mm] 0.4625 | | |
| Y' [mm] 1.750 | | ω [°] 30.56 | | | TL [mm] 3.179 | | |
| si | i | r [mm] | i | d [mm] | i | Nd | vd | Element |
| s4 | * | 4 | 2.301 | | | | | |
| | | | | 4 | 0.373 | | | |
| s5 | * | 5 | −1.948 | | | | | L3 BK2 |
| | | | | 5 | 0.100 | 4 | 1.5071 | 54.00 |
| s6 | | 6 | ∞ | | | | | |
| | | | | 6 | 0.695 | 5 | 1.6492 | 29.92 LS2 |
| s7 | | 7 | ∞ | | | | | |
| | | | | 7 | 0.680 | 6 | 1.5071 | 54.00 L4 |
| s8 | * | 8 | 18.783 | | | | | |
| | | | | 8 | 0.463 | | | |
| s9 | | 9 | ∞ | | | | | SR |

TABLE 2

| EXAMPLE 1 Aspherical Surface Data | | | | |
|---|---|---|---|---|
| si | s1 | s4 | s5 | s8 |
| K | −1.20E−01 | 1.63E+01 | 1.04E+01 | −3.60E+04 |
| A | 1.30E−02 | 3.20E−02 | −4.11E−01 | −3.72E−02 |
| B | 2.66E−02 | 2.71E−01 | 3.07E−01 | −1.36E−01 |
| C | 1.51E−01 | −9.96E−01 | −4.63E+00 | 5.58E−02 |
| D | −1.54E−01 | 1.63E+00 | 9.15E+00 | 2.95E−03 |
| E | −2.05E−01 | −2.38E+00 | −4.59E+00 | −1.45E−02 |
| F | 2.63E+00 | 7.12E+01 | −7.14E+01 | −4.84E−03 |
| G | −3.72E+00 | −3.52E+00 | −2.51E+01 | 4.32E−03 |
| H | 3.33E+00 | −4.13E+01 | −6.52E+01 | 2.28E−03 |
| I | 2.59E+00 | −5.28E+02 | −1.88E+02 | −1.37E−03 |

●EXAMPLE 2

TABLE 3

| EXAMPLE 2 | | | | | | | |
|---|---|---|---|---|---|---|---|
| f [mm] 2.979 | | Fno 2.8 | | | BF [mm] 0.7526 | | |
| Y' [mm] 1.750 | | ω [°] 30.43 | | | TL [mm] 3.448 | | |
| si | i | r [mm] | i | d [mm] | i | Nd | vd | Element |
| s1 | * | 1 | 0.934 | | | | | L1 BK1 |
| | | | | 1 | 0.362 | 1 | 1.4875 | 70.45 |
| s2 | ape | 2 | ∞ | | | | | |
| | | | | 2 | 0.427 | 2 | 1.6886 | 47.43 LS1 |
| s3 | | 3 | ∞ | | | | | |
| | | | | 3 | 0.074 | 3 | 1.6889 | 31.16 L2 |
| s4 | * | 4 | 2.194 | | | | | |
| | | | | 4 | 0.726 | | | L3 BK2 |
| s5 | * | 5 | 4.356 | | | | | |
| | | | | 5 | 0.124 | 4 | 1.5305 | 55.72 |
| s6 | | 6 | ∞ | | | | | |
| | | | | 6 | 0.362 | 5 | 1.6886 | 47.43 LS2 |
| s7 | | 7 | ∞ | | | | | |
| | | | | 7 | 0.619 | 6 | 1.5305 | 55.72 L4 |
| s8 | * | 8 | 6.134 | | | | | |
| | | | | 8 | 0.753 | | | |
| s9 | | 9 | ∞ | | | | | SR |

TABLE 4

EXAMPLE 2
Aspherical Surface Data

| si | s1 | s4 | s5 | s8 |
|---|---|---|---|---|
| K | 1.78E−02 | 6.32E+00 | −4.52E+01 | −9.45E+00 |
| A | −2.99E−03 | 1.17E−01 | −7.05E−02 | −3.51E−02 |
| B | 1.01E−01 | 2.15E−01 | −2.74E−02 | −7.32E−03 |
| C | −6.96E−03 | 1.70E−01 | −9.45E−03 | −1.25E−02 |
| D | −3.67E−01 | 1.01E+00 | 2.67E−03 | 1.77E−03 |
| E | −4.39E−01 | 9.13E−01 | 6.76E−03 | −6.39E−04 |
| F | 3.39E+00 | −3.45E+00 | 2.96E−03 | 2.11E−04 |

●EXAMPLE 3

TABLE 5

EXAMPLE 3 f [mm] 1.552　　Fno 2.8　　BF [mm] 0.7221
Y' [mm] 0.880　　ω [°] 29.60　　TL [mm] 2.370

| si | i | r [mm] | i | d [mm] | i | Nd | νd | Element | |
|---|---|---|---|---|---|---|---|---|---|
| s1 | ape | 1 | ∞ | | | | | ape | |
| | | | 1 | 0.237 | | | | | |
| s2 | * | 2 | 0.931 | | | | | L1 | BK1 |
| | | | 2 | 0.191 | 1 | 1.5150 | 58.10 | | |
| s3 | | 3 | ∞ | | | | | | |
| | | | 3 | 0.621 | 2 | 1.7130 | 53.94 | LS1 | |
| s4 | | 4 | ∞ | | | | | | |
| | | | 4 | 0.150 | 3 | 1.6363 | 23.00 | L2 | |
| s5 | * | 5 | −3.554 | | | | | | |
| | | | 5 | 0.100 | | | | | |
| s6 | * | 6 | −13.306 | | | | | L3 | BK2 |
| | | | 6 | 0.050 | 4 | 1.6363 | 23.00 | | |
| s7 | | 7 | ∞ | | | | | | |
| | | | 7 | 0.300 | 5 | 1.5163 | 64.10 | LS2 | |
| s8 | | 8 | ∞ | | | | | | |
| | | | 8 | 0.100 | | | | | |
| s9 | | 9 | ∞ | | | | | | PT1 |
| | | | 9 | 0.200 | 6 | 1.5163 | 64.10 | | |
| s10 | | 10 | ∞ | | | | | | |
| | | | 10 | 0.490 | | | | | |
| s11 | | 11 | ∞ | | | | | SR | |

TABLE 6

EXAMPLE 3
Aspherical Surface Data

| si | s2 | s5 | s6 |
|---|---|---|---|
| K | −3.14E+00 | 3.81E+01 | 5.87E+02 |
| A | 4.74E−01 | 2.33E−01 | −2.10E−01 |
| B | −7.52E−01 | 1.49E−01 | −1.25E+00 |
| C | 3.57E+00 | −4.41E+00 | 0.00E+00 |
| D | −6.42E+00 | 1.48E+01 | 0.00E+00 |

●EXAMPLE 4

TABLE 7

EXAMPLE 4 f [mm] 2.809　　Fno 2.8　　BF [mm] 0.6900
Y' [mm] 1.750　　ω [°] 31.25　　TL [mm] 3.200

| si | | i | r [mm] | i | d [mm] | i | Nd | νd | Element | |
|---|---|---|---|---|---|---|---|---|---|---|
| s1 | * | 1 | 0.838 | | | | | | L1 | BK1 |
| | | | | 1 | 0.289 | 1 | 1.5071 | 54.00 | | |
| s2 | | 2 | ∞ | | | | | | | |
| | | | | 2 | 0.296 | 2 | 1.6952 | 53.81 | LSP1o | LS1 |
| s3 | ape | 3 | ∞ | | | | | | | |
| | | | | 3 | 0.254 | 3 | 1.6952 | 53.81 | LSP1m | |
| s4 | | 4 | ∞ | | | | | | | |
| | | | | 4 | 0.070 | 4 | 1.5737 | 29.00 | L2 | |
| s5 | * | 5 | 1.935 | | | | | | | |
| | | | | 5 | 0.235 | | | | | |
| s6 | * | 6 | −2.568 | | | | | | L3 | BK2 |
| | | | | 6 | 0.170 | 5 | 1.5737 | 29.00 | | |
| s7 | | 7 | ∞ | | | | | | | |
| | | | | 7 | 0.780 | 6 | 1.4874 | 70.44 | LS2 | |
| s8 | | 8 | ∞ | | | | | | | |
| | | | | 8 | 0.419 | 7 | 1.5737 | 29.00 | L4 | |
| s9 | * | 9 | −5.977 | | | | | | | |
| | | | | 9 | 0.683 | | | | | |
| s10 | | 10 | ∞ | | | | | | SR | |

TABLE 8

EXAMPLE 4
Aspherical Surface Data

| si | s1 | s5 | s6 | s9 |
|---|---|---|---|---|
| K | 1.91E−01 | 4.31E+00 | 1.77E+01 | −1.64E+02 |
| A | −4.93E−02 | 2.38E−01 | −2.65E−01 | −1.27E−01 |
| B | 4.30E−02 | −1.01E+00 | −3.91E−01 | 5.68E−02 |
| C | −2.25E−01 | 6.62E+00 | −1.50E+00 | −2.95E−02 |

● EXAMPLE 5

TABLE 9

EXAMPLE 5 f [mm] 2.962   Fno 2.8   BF [mm] 0.4200
Y' [mm] 1.750   ω [°] 29.58   TL [mm] 3.210

| si | i | r [mm] | i | d [mm] | i | Nd | νd | Element | |
|---|---|---|---|---|---|---|---|---|---|
| s1 | * | 1 | 0.920 | | | | | L1 | BK1 |
| | | | 1 | 0.412 | 1 | 1.5071 | 54.00 | | |
| s2 | | 2 | ∞ | | | | | | |
| | | | 2 | 0.470 | 2 | 1.6952 | 53.81 | LSP1o | LS1 |
| s3 | ape | 3 | ∞ | | | | | | |
| | | | 3 | 0.080 | 3 | 1.6952 | 53.81 | LSP1m | |
| s4 | | 4 | ∞ | | | | | | |
| | | | 4 | 0.070 | 4 | 1.5737 | 29.00 | L2 | |
| s5 | * | 5 | 2.490 | | | | | | |
| | | | 5 | 0.425 | | | | | |
| s6 | * | 6 | −2.645 | | | | | L3 | BK2 |
| | | | 6 | 0.215 | 5 | 1.5737 | 29.00 | | |
| s7 | | 7 | ∞ | | | | | | |
| | | | 7 | 0.500 | 6 | 1.4874 | 70.44 | LS2 | |
| s8 | | 8 | ∞ | | | | | | |
| | | | 8 | 0.617 | 7 | 1.5737 | 29.00 | L4 | |
| s9 | * | 9 | 7.023 | | | | | | |
| | | | 9 | 0.411 | | | | | |
| s10 | | 10 | ∞ | | | | | SR | |

TABLE 10

EXAMPLE 5
Aspherical Surface Data

| si | s1 | s5 | s6 | s9 |
|---|---|---|---|---|
| K | 4.11E−02 | 1.28E+00 | 1.60E+01 | −1.00E+05 |
| A | −2.47E−02 | 1.69E−01 | −3.98E−01 | −4.53E−02 |
| B | 1.42E−03 | −6.17E−03 | 7.31E−01 | −2.98E−02 |
| C | −4.23E−02 | 1.55E+00 | −2.56E+00 | −5.48E−03 |

● EXAMPLE 6

TABLE 11

EXAMPLE 6 f [mm] 1.590   Fno 2.8   BF [mm] 1.1036
Y' [mm] 0.880   ω [°] 28.96   TL [mm] 2.204

| si | i | r [mm] | i | d [mm] | i | Nd | νd | Element | |
|---|---|---|---|---|---|---|---|---|---|
| s1 | * | 1 | 0.802 | | | | | L1 | BK1 |
| | | | 1 | 0.050 | 1 | 1.5071 | 54.00 | | |
| s2 | ape | 2 | ∞ | | | | | | |
| | | | 2 | 0.670 | 2 | 1.6077 | 56.20 | LS1 | |

TABLE 11-continued

EXAMPLE 6 f [mm] 1.590   Fno 2.8   BF [mm] 1.1036
Y' [mm] 0.880   ω [°] 28.96   TL [mm] 2.204

| si | i | r [mm] | i | d [mm] | i | Nd | νd | Element |
|---|---|---|---|---|---|---|---|---|
| s3 | | 3 | ∞ | | | | | |
| | | | 3 | 0.050 | 3 | 1.5071 | 54.00 | L2 |
| s4 | * | 4 | 100.000 | | | | | |
| | | | 4 | 0.050 | | | | |

TABLE 11-continued

EXAMPLE 6 f [mm] 1.590   Fno 2.8   BF [mm] 1.1036
Y' [mm] 0.880   ω [°] 28.96   TL [mm] 2.204

| si | i | r [mm] | i | d [mm] | i | Nd | νd | Element |
|---|---|---|---|---|---|---|---|---|
| s5 | | 5 | ∞ | | | | | PT1 |
| | | | 5 | 0.880 | 4 | 1.5163 | 64.10 | |
| s6 | | 6 | ∞ | | | | | |
| | | | 6 | 0.471 | | | | |
| s7 | | 7 | ∞ | | | | | SR |

TABLE 12

EXAMPLE 6
Aspherical Surface Data

| si | s1 | s4 |
|---|---|---|
| K | −1.53E+00 | −1.00E+00 |
| A | −6.59E−01 | 1.83E+00 |
| B | 5.00E+01 | −1.42E+01 |
| C | −9.55E+02 | 1.12E+02 |
| D | 6.20E+03 | −3.39E+02 |

●EXAMPLE 7

TABLE 13

EXAMPLE 7

| f [mm] 1.590 | | | Fno 2.8 | | | BF [mm] 0.9367 | |
|---|---|---|---|---|---|---|---|
| Y' [mm] 0.880 | | | ω [°] 29.00 | | | TL [mm] 2.280 | |

| si | i | r [mm] | i | d [mm] | i | Nd | vd | Element |
|---|---|---|---|---|---|---|---|---|
| s1 | ape | 1 | ∞ | | | | | ape |
| | | | 1 | 0.255 | | | | |
| s2 | * | 2 | 1.021 | | | | | |
| | | | 2 | 0.191 | 1 | 1.5500 | 58.00 | L1  BK1 |
| s3 | | 3 | ∞ | | | | | |
| | | | 3 | 0.789 | 2 | 1.4400 | 35.00 | LS1 |
| s4 | | 4 | ∞ | | | | | |
| | | | 4 | 0.150 | 3 | 1.6363 | 23.00 | L2 |
| s5 | * | 5 | −4.135 | | | | | |
| | | | 5 | 0.937 | | | | |
| s6 | | 6 | ∞ | | | | | SR |

TABLE 14

EXAMPLE 7
Aspherical Surface Data

| si | s2 | s5 |
|---|---|---|
| K | −6.33E+00 | −4.97E+00 |
| A | 8.06E−01 | 2.87E−01 |
| B | −1.89E+00 | 1.31E+00 |
| C | 4.55E+00 | −4.00E+00 |
| D | −5.03E+00 | 6.24E+00 |

●EXAMPLE 8

TABLE 15

EXAMPLE 8

| f [mm] 1.334 | | | Fno 2.8 | | | BF [mm] 1.3414 | |
|---|---|---|---|---|---|---|---|
| Y' [mm] 0.880 | | | ω [°] 33.40 | | | TL [mm] 2.040 | |

| si | i | r [mm] | i | d [mm] | i | Nd | vd | Element |
|---|---|---|---|---|---|---|---|---|
| s1 | * | 1 | −37.560 | | | | | L1  BK1 |
| | | | 1 | 0.050 | 1 | 1.5200 | 54.00 | |
| s2 | ape | 2 | ∞ | | | | | |
| | | | 2 | 0.434 | 2 | 1.7130 | 53.94 | LS1 |
| s3 | | 3 | ∞ | | | | | |
| | | | 3 | 0.216 | 3 | 1.5200 | 54.00 | L2 |
| s4 | * | 4 | −0.685 | | | | | |
| | | | 4 | 1.341 | | | | |
| s5 | | 6 | ∞ | | | | | SR |

TABLE 16

EXAMPLE 8
Aspherical Surface Data

| si | s1 | s4 |
|---|---|---|
| K | 1.77E+04 | 3.35E−01 |
| A | 4.65E−02 | 1.28E+00 |
| B | 1.24E+00 | −1.10E+01 |
| C | −1.30E+01 | 5.77E+01 |
| D | −1.84E+02 | −9.18E+01 |
| E | 0.00E+00 | 2.76E+01 |

[■ Aberrations in the Imaging Lens]

The aberrations in the imaging lens LN in Examples (EX) 1 to 8 are shown in FIGS. 9A to 16C. These aberration diagrams show longitudinal spherical aberration, astigmatism (astigmatic field curves), and distortion.

The spherical aberration diagrams show the amount of spherical aberration for d-line (with a wavelength of 587.56 nm), the amount of spherical aberration for C-line (with a wavelength of 656.28 nm), and the amount of spherical aberration for g-line (with a wavelength of 435.84 nm), as expressed in terms of deviations from the paraxial image surface along the optical axis AX (in the unit of nm). In the spherical aberration diagrams, the vertical axis represents the value of the height of incidence on the pupil as normalized with respect to its maximum height (i.e., the relative pupil height). What types of line are used to represent d-, c-, and g-lines is indicated in each diagram.

The astigmatism diagrams show the tangential image surface for d-line and the sagittal image surface for d-line, as expressed in terms of deviations from the paraxial image surface along the optical axis AX (in the unit of mm) The line marked "T" corresponds to the tangential image surface, and the line marked "S" corresponds to the sagittal image surface. In the astigmatism diagrams, the vertical axis represents the image height (IMG HT) (in the unit of mm).

In the distortion diagrams, the horizontal axis represents the distortion (in the unit of %) for d-line, and the vertical axis represents the image height (in the unit of mm) The image height corresponds to the maximum image height Y' (half the diagonal length of the sensing surface SS of the imaging sensor SR) on the imaging surface.

[■ Details of the Imaging Lens]

The construction of the imaging lens LN will now be described in more detail below.

The imaging lens LN includes a lens block (wafer scale lens) BK. The lens block BK is, as described previously, mass-produced inexpensively. To allow a wider choice of materials in its production, for example, to allow the choice of easy-to-process or inexpensive materials (to manufacture the imaging lens LN easily and inexpensively), the lens block BK includes a lens L and a lens substrate LS made of different materials.

Furthermore, in consideration of a balance among various benefits such as compactness, high performance (for example, high aberration correction performance), and low cost, the imaging lens LN includes one or two lens blocks BK.

As shown in FIGS. 18B and 18C, the imaging lens LN is manufactured by joining together lens block units UT, which each have a number of molded lenses L arranged on a lens substrate LS, and also a substrate B2, which can serve as a sensor cover, with spacer members B1 in between, and then cutting them apart along the spacer members B1.

Thus, when the lens substrates LS are plane-parallel plates, in the manufacturing process of the imaging lens LN, not only is the processing of the lens substrate LS easy or unnecessary, but also the lenses L, formed on the substrate surfaces, are stable. Thus, a lens substrate LS in the form of a plane-parallel plate helps alleviate the burden involved in the manufacturing of the imaging lens LN.

Furthermore, when the lens substrates LS are plane-parallel plates, the boundary surface between a substrate surface and a lens L has no optical power. Thus, for example, the surface accuracy on a substrate surface of the lens substrate LS little affects the focus position of the imaging lens LN on the image surface. This gives the imaging lens LN high performance In the imaging lens LN, a first lens block BK1 disposed at the most object-side position exerts a positive optical power. For example, a lens L[LS1o] is contiguous with the object-side substrate surface of a first lens substrate LS1, and the object-side lens surface of the lens L[LS1o] is a plano-convex lens including a convex surface on the object side and a planar surface on the image side; with this design, the first lens block BK1 exerts a positive optical power.

In the imaging lens LN constructed as described above, from the viewpoint of chromatic aberration correction, it is preferable that at least one of conditional formulae (C3) to (C1) below be fulfilled (it is further preferable that more than one of them be fulfilled).

Figure 19:
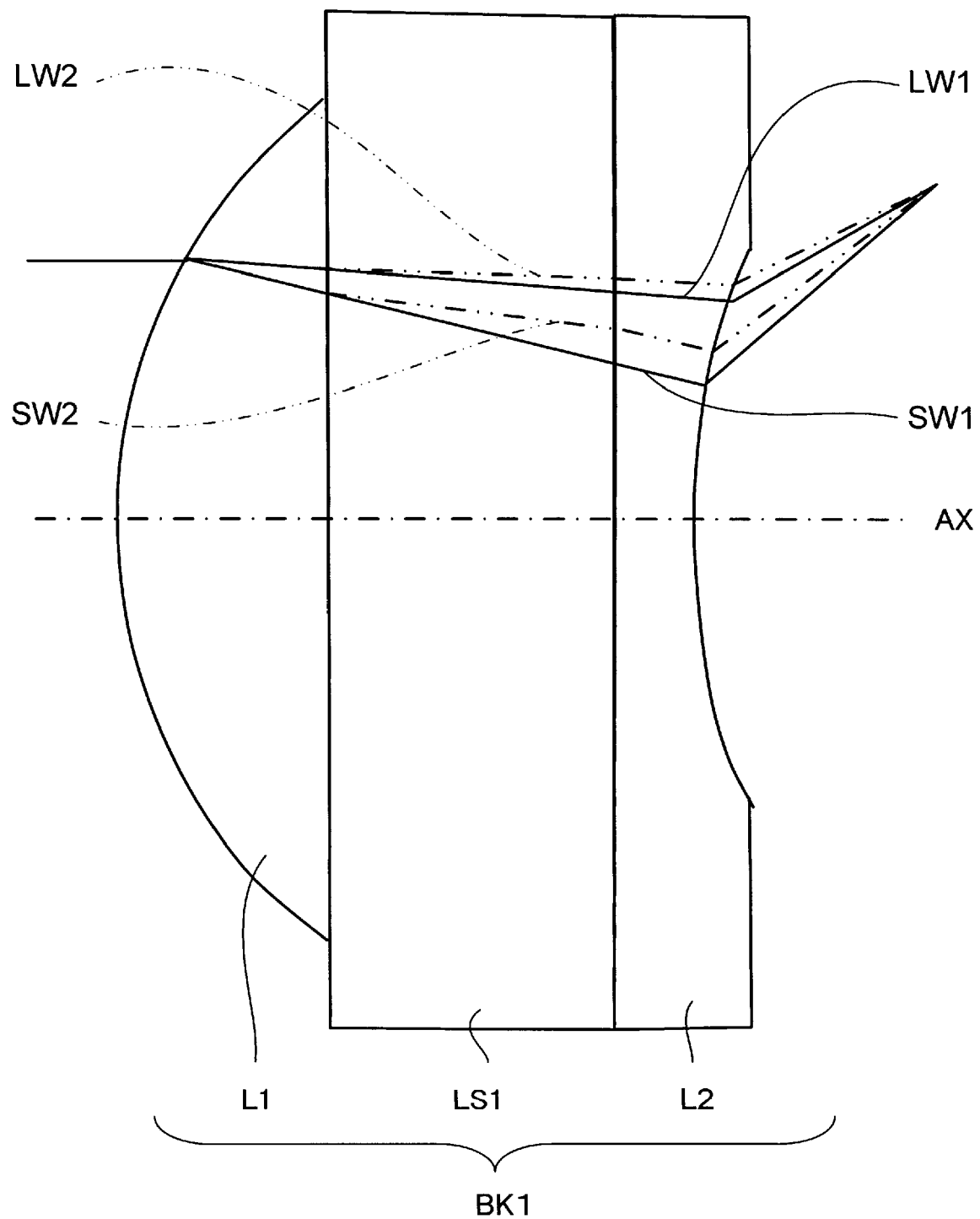
[FIG. 19] is a sectional diagram showing a lens block used for an explanation.

Now, chromatic aberration correction in the imaging lens LN will be described with reference to FIG. 19. FIG. 19 shows the first lens block BK1. In this figure, the solid lines SW1 and LW1 represent, for a case where the lens substrate LS1 is absent, the optical paths of short wavelength light and long wavelength light, respectively (in short, their optical paths on the assumption that they travel in air). The dash-dot-dot lines SW2 and LW2 represent, for a case where the lens substrate LS1 is present, the optical paths of short wavelength light and long wavelength light, respectively.

As shown in FIG. 19, light from the object side passes through a first lens L1 (lens L[LS1o]), a first lens substrate LS1, and a second lens L2 (lens L[LS1m]) in this order. Of the light incident on the first lens L1, short wavelength light is, as it advances, refracted more than long wavelength light. Thus, when the short and long wavelength lights having passed through the first lens L1 are incident on the object-side substrate surface of the first lens substrate LS1, the angle of incidence of short wavelength light is larger than that of long wavelength light.

Here, because the index of refraction N of the first lens substrate LS1 [LS1] is higher than the index of refraction N of the first lens L1 [L[LS1o]], according to Snell's law, the angle of emergence at which short wavelength light emerges from the object-side substrate surface of the first lens substrate LS1 is smaller than the angle of incidence at which it is incident on the object-side substrate surface of the first lens substrate LS1. Needless to say, the same applies to long wavelength light.

The difference in index of refraction between the first lens L1 and the first lens substrate LS1 with respect to short wavelength light is greater than the difference in index of refraction between the first lens L1 and the first lens substrate LS1 with respect to long wavelength light (in short, of the short and long wavelength lights incident from the first lens L1 on the first lens substrate LS1, the short wavelength light is refracted more).

Accordingly, the optical path LW2 of the long wavelength light traveling in the first lens substrate LS1 is, as it advances, refracted to deviate slightly toward the peripheral edge of the first lens substrate LS1 as compared with the optical path LW1. On the other hand, the optical path SW2 of the short wavelength light traveling in the first lens substrate LS1 is, as it advances, refracted to deviate greatly toward the peripheral edge of the first lens substrate LS1 as compared with the optical path SW1.

As a result, the optical path displacement between the short and long wavelength lights (see SW2 and LW2) traveling in the first lens substrate LS1 is smaller than the optical path displacement between the short and long wavelength lights (see SW1 and LW1) as observed when they travel in air in the absence of the first lens substrate LS1. Thus, in the imaging lens LN, as expressed by conditional formula (C3) below, when the index of refraction of the first lens substrate LS1 is higher than that of the lens L[LS1o] (when the difference between the their respective indices of refraction is large), chromatic aberration arising from a difference in light wavelength is corrected.

$$0.1 \leq N[LS1] - N[L[LS1o]] \quad (C3)$$

where
N[LS1] represents the index of refraction of the first lens substrate LS1; and
N[L[LS1o]] represents the index of refraction of the lens L[LS1o].

With a lens formed out of a material with an extremely high dispersion or a material with an extremely low dispersion, conditional formula (C3) is difficult to fulfill. Conversely, when the image lens LN fulfills conditional formula (C3), it is manufactured inexpensively, since it can employ inexpensive lenses.

It is preferable that the imaging lens LN fulfill conditional formula (C1) below. Conditional formula (C1) defines the difference (here, in terms of absolute value) between the index of refraction of the first lens substrate and the index of refraction of the lens L[LS1o].

$$0.1 \leq |N[LS1] - N[L[LS1o]]| \quad (C1)$$

where
N[LS1] represents the index of refraction of the first lens substrate LS1; and
N[L[LS1o]] represents the index of refraction of the lens L[LS1o].

In a case where the number of lens blocks BK included in the imaging lens LN is comparatively small, despite its being compact, aberration correction is difficult. However, if the value of conditional formula (C1) is more than the lower limit, the imaging lens LN can correct chromatic aberration. Thus, the imaging lens LN is then compact and nevertheless has optical performance comparable with that of a conventional normal lens system (normal lens) formed of glass or resin.

It is preferable that, within the conditional range defined by conditional formula (C1), the conditional range defined by conditional formula (C1a) be fulfilled.

$$0.15 \leq |N[LS1] - N[L[LS1o]]| \quad (C1a)$$

In an imaging lens LN fulfilling at least one of conditional formulae (C3) and (C1) (or (C1a)), it is preferable that the object-side lens surface of the lens L[LS1o] in the first lens block BK1 be convex to the object side.

With this design, the light (light beam) incident from the object side of the lens L[LS1o] is first made to converge, and is then, by various surfaces located to the image side of the lens L[LS1o], made to diverge from the optical axis and thereby separated into parts at different image heights (hereinafter, this phenomenon will be referred to as "a light beam being separated"). Separating a light beam by surfaces (substrate surfaces and lens surfaces) in this way permits, for example, lens surfaces to correct aberrations for each of the separated parts of the light beam. Thus, in the imaging lens LN, aberrations are corrected efficiently.

In addition, in this imaging lens LN, it is preferable that conditional formula (C2) below be fulfilled. Conditional formula (C2) defines the focal length of the object-side lens surface of the lens L[LS1o] in terms of the focal length of the entire imaging lens LN (entire system).

$$0.6 \leq f[L[LS1o]o]/f[all] \leq 2.0 \quad (C2)$$

where
f[L[LS1o]o] represents the focal length of the object-side lens surface of the lens L[LS1o]; and f[all] represents the focal length of the entire imaging lens LN.

If the value of conditional formula (C2) is less than the lower limit, for example, the positive optical power of the object-side lens surface of the lens L[LS1o] is too strong, and thus the angle of emergence of light from the image-side lens surface of the lens L[LS1o] (and hence the angle of emergence of light from the first block BK1) is excessively large. This leads to lower telecentricity to the image surface. Owing to the too strong positive optical power on the object-side lens surface of the lens L[LS1o], the imaging lens LN tends to produce aberrations. For example, if the curvature of the object-side lens surface of the lens L[LS1o] is so sharp as to produce comparatively large aberrations, the image-side lens surface (planar surface) of the lens L[LS1o] cannot correct them satisfactorily.

By contrast, if the value of conditional formula (C2) is more than the upper limit, for example, the positive optical power of the object-side lens surface of the lens L[LS1o] is too weak, and thus the light reaching a second lens block BK2 etc. is not separated into parts at different image heights. This makes it difficult to correct aberrations for each of the parts of the light beam at different image heights. Moreover, as a result of the focal length of the object-side lens surface of the lens L[LS1o] being comparatively long, the imaging lens LN has an increased optical total length.

Thus, when the value of conditional formula (C2) falls within the range from the lower limit to the upper limit, the imaging lens LN is compact and has high performance (for example, telecentricity, and high aberration correction performance).

Moreover, in the imaging lens LN, it is preferable that conditional formula (C4) below be fulfilled. Conditional formula (C4) signifies that the Abbe number of the lens L[LS1o] is greater than that of the first lens substrate LS1.

$$v[LS1]<v[L[LS1o]]$$ (C4)

where
v[LS1] represents the Abbe number of the first lens substrate LS1; and
v[L[LS1o]] represents the Abbe number of the lens L[LS1o].

An Abbe number is a value indicating the dispersion of a material, and specifically is the ratio of the difference between the index of refraction nF for blue light with a wavelength of 486.1 nm (F-line) and the index of refraction nC for red light with a wavelength of 656.3 nm (C-line) to the difference between the index of refraction for yellow light with a wavelength of 587.6 nm (d-line) and the index of refraction of air. A small Abbe number signifies a large difference between the index of refraction for F-line and the index of refraction for C-line. This means that short wavelength light is refracted comparatively greatly.

Thus, with an imaging lens LN fulfilling conditional formula (C4), as in a case where at least one of conditional formulae (C3) and (C1) is fulfilled, chromatic aberration is corrected. Needless to say, it is further preferable that more than one of conditional formulae (C1) to (C4) be fulfilled simultaneously.

Other than those imaging lenses LN, there still are imaging lenses LN that are manufactured easily and inexpensively and yet correct chromatic aberration. Examples are imaging lenses LN fulfilling conditional formulae (CC1) and (CC2) below. Conditional formula (CC1) defines the ratio of the index of refraction of the first lens substrate LS1 to the index of refraction of the lens L[LS1o], and in short signifies that the index of refraction of the first lens substrate LS1 is smaller than that of the lens L[LS1o].

$$N[LS1]/N[L[LS1o]]<1$$ (CC1)

$$40 \leq v[LS1]$$ (CC2)

where
N[LS1] represents the index of refraction of the first lens substrate LS1;
N[L[LS1o]] represents the index of refraction of the lens L[LS1o]; and
v[LS1] represents the Abbe number of the first lens substrate LS1.

Figure 20:
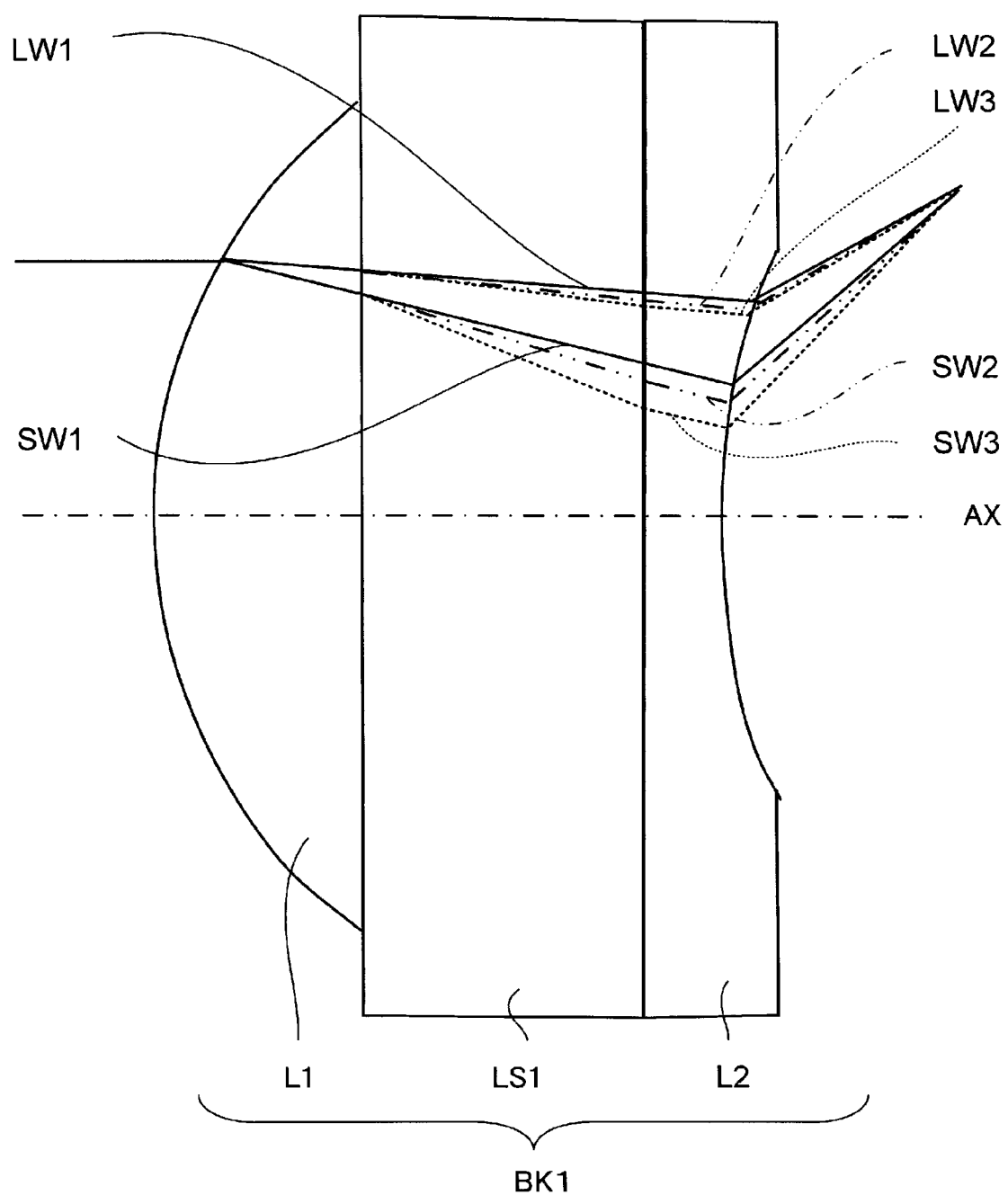
[FIG. 20] is a sectional diagram showing another lens block used for an explanation, different from the one shown in FIG. 19.

Conditional formula (CC2) will now be described with reference to FIG. 20. FIG. 20, like FIG. 19, shows the lens block BK1. In FIG. 20, the solid lines SW1 and LW1 represent, for a case where the lens substrate LS1 is absent, the optical paths of short wavelength light and long wavelength light, respectively. The dash-dot-dot lines SW2 and LW2 represent, for a case where a lens substrate LS1 fulfilling conditional formula (CC2) is present, the optical paths of short wavelength light and long wavelength light, respectively. The doted line SW3 and LW3 represent, for a case where a lens substrate LS1 not fulfilling conditional formula (CC2) is present, the optical paths of short wavelength light and long wavelength light, respectively.

As described previously, of the light incident on the first lens L1 (lens L[LS1o]), short wavelength light is, as it advances, refracted more than long wavelength light; thus, when the short and long wavelength lights having passed through the first lens L1 are incident on the object-side substrate surface of the first lens substrate LS1, the angle of incidence of short wavelength light is larger than that of long wavelength light.

Since the index of refraction N[LS1] of the first lens substrate LS1 is lower than the index of refraction N[L[LS1o]] of the first lens L1, according to Snell's law, the angle of emergence at which short wavelength light emerges from the object-side substrate surface of the first lens substrate LS1 is larger than the angle of incidence at which it is incident on the objective-side substrate surface of the first lens substrate LS1. Needless to say, the same applies to long wavelength light.

If, in addition, the Abbe number here is comparatively small, the band of light formed between the optical path SW3 of short wavelength light and the optical path LW3 of long wavelength light widens as it approaches the image side of the first lens substrate LS1 (i.e., the optical path displacement between the optical path SW3 and the optical path LW3 increases). As a result, notable chromatic aberration occurs.

However, when conditional formula (CC2) is fulfilled, the band of light formed between the optical path SW2 of the short wavelength light and the optical path LW2 of the long wavelength light does not widen as much as the band of light formed between the optical path SW3 of the short wavelength light and the optical path LW3 of the long wavelength light. That is, the optical path displacement between the optical path SW2 and the optical path LW2 does not increase excessively. Thus, with an imaging lens LN fulfilling conditional formulae (CC1) and (CC2), as with an imaging lens LN fulfilling at least one of conditional formulae (C1), (C3), and (C4), chromatic aberration attributable to a difference in light wavelength is corrected.

In an imaging lens LN including a first lens block BK alone as a lens block BK (an optical device having an optical power), it is preferable that in the first lens block BK1, the image-side lens surface of the lens L[LS1m] be convex to the image side (it is particularly preferable that the object-side lens surface of the lens L[LS1o] be convex to the object side).

With a first lens block BK1 like this, even when it exerts a positive optical power equal to that exerted by a first lens block BK1 including, for example, a lens L[LS1o] whose object-side lens surface is convex to the object side and a lens L[LS1m] whose image-side lens surface is other than convex to the image side, it is possible to reduce the optical power of the object-side convex surface of the lens L[LS1o]. That is, it is possible to distribute the optical power for which the first lens block BK1 exerting a positive optical power is responsible between the object-side convex surface of the lens L[LS1o] and the image-side convex surface of the lens L[LS1m].

This permits a lens responsible for an accordingly low optical power, for example the lens [LS1o], to have a comparatively large radius of curvature, resulting in the lens [LS1o] having a smaller volume. Reducing the volume of the lens L[LS1o] in this way, for example when it is formed out of expensive resin, helps reduce its cost.

In addition, a lens L with a comparatively large radius of curvature is comparatively easy to manufacture, and is also easy to evaluate in terms of its performance in various aspects (for example, the sensitivity to an off-axial eccentric error). Moreover, a lens with a comparatively low optical power produces less aberrations of various kinds attributable to the optical power; thus, an imaging lens LN including such a lens L corrects aberrations of various kinds efficiently.

In an imaging lens LN including a first lens block BK1 that includes a lens L[LS1m] whose image-side lens surface is convex to the image side and that exerts a positive optical power, it is preferable that the image-side lens surface of the lens L[LS1m] be an aspherical surface that is convex at its vertex and that is concave in its part where it intersects the principle ray with the maximum image height.

In such an imaging lens LN, for example, when the object-side lens surface of the lens L[LS1o] is convex to the object side, light is, by various surfaces (substrate surfaces and lens surfaces) located to the image side of that lens surface, made to diverge from the optical axis and thereby separated into parts at different image height; thus these lens surfaces correct curvature of field and other aberrations for each of the separated parts of the light beam.

Especially, in a case where the image-side lens surface of the lens L[LS1m] corrects curvature of field, when that image-side lens surface is an aspherical surface that is convex in its part where it intersects the optical axis and that is concave in its part where it overlaps the peripheral edge of the light beam, the optical power exerted by the part of the lens intersecting the optical axis and the optical power exerted by the part of the lens intersecting the peripheral edge of the light beam(a peripheral portion within the effective diameter) are in a mutually opposite relationship. When such an optical power relationship holds, the curvature of field resulting from the optical path difference between principal and off-axial rays on the image surface is corrected.

When such an optical power relationship holds, even an imaging lens LN including only a small number of lens blocks BK can correct curvature of field efficiently.

In an imaging lens LN including a first lens block BK alone as a lens block BK, it is preferable that first lens block BK1 exert a positive optical power, and that the image-side lens surface of the lens L[LS1m] be concave to the image side.

This design shifts the front principal point to the object side. This reduces the total length of the imaging lens LN. In addition, the Petzval sum, which is defined by formula (PS) below, is then small. This is because, for example, the focal length of the object-side convex surface of the object-side lens surface of the lens L[LS1o] and the focal length of the image-side concave surface of the image-side lens surface of the lens L[LS1m] are in a mutually canceling relationship. When the Petzval sum is zero, the paraxial image surface has a curvature of zero, and is thus planar, providing an ideal surface.

[Formula PS]

$$\sum_j \frac{1}{f_j n_j} \tag{PS}$$

where
  fj represents the focal length of the jth lens surface as counted from the object side; and
  nj represents the index of refraction of the lens material forming the jth lens surface as counted from the object side.

A second lens block BK2 included in the imaging lens LN is preferably configured as follows (a first example). Specifically, in the second lens block BK2, it is preferable that the object-side lens surface of a lens L[LS2o] be convex to the object side and aspherical, and that the image-side lens surface of a lens L[LS2m] be aspherical.

With this design, light from the second lens block BK2 is made to converge so that it approaches and is incident on the image surface approximately perpendicularly to it. That is, telecentricity to the image surface is secured. In addition, the object-side convex surface of the object-side lens surface of the lens L[LS2o] permits light to be, by the image-side lens surface of the lens L[LS2m] located on the image side of that lens surface, made to diverge from the optical axis and thereby separated into parts at different heights. Thus, when the image-side lens surface of the lens L[LS2m] is aspherical, this aspherical surface corrects aberrations for each of the separated parts of the light beam.

Especially, when the first lens block BK1 exerting a positive optical power includes an image-side concave lens L[LS1m], the image-side concave surface of this lens L[LS1m], to a great degree, makes the light passing therethrough diverge from the optical axis and thereby separates it into parts at different image heights before the light reaches the object-side lens surface of the lens L[LS2o]. Then, the aspherical surface of the object-side lens surface of the lens L[LS2o] corrects, for example, distortion efficiently, and the aspherical surface of the image-side lens surface of the lens L[LS2m] corrects, for example, curvature of field efficiently.

Alternatively, a second lens block BK2 included in the imaging lens LN is preferably configured as follows (a second example). Specifically, in the second lens block BK2, the object-side lens surface of a lens L[LS2o] may be concave to the object side and aspherical, and the image-side lens surface of a lens L[LS2m] may be aspherical.

With this design, the focal length of the first lens block BK1 exerting a positive optical power (in particular, the focal length of the object-side convex surface of the object-side lens surface of the lens L[LS1o]) and the focal length of the object-side concave surface of the object-side lens surface of the lens L[LS2o] are in a mutually canceling relationship, resulting in a small Petzval sum.

Moreover, the object-side concave surface of the lens L[LS2o] receives light in the process of being made to converge by, for example, the object-side convex surface (with a positive optical power) of the lens L[LS1o]. Thus, the object-side concave surface of the lens L[LS2o] corrects aberrations for a light beam before coming to have its minimal size, correcting aberrations even at the peripheral edge of the light beam.

Moreover, the distance from the object-side convex surface of the lens L[LS1o] to the object-side concave surface of the lens L[LS2o] is neither too small nor too large. Thus, much freedom is allowed in the curvature of the object-side concave surface of the lens L[LS2o], save the restrictions imposed by the positive optical power exerted by the object-side convex surface of the lens L[LS1o]. This makes it easy to design the lens L[LS2o] for a Petzval sum closer to zero.

There is no particular restriction on the type of the first lens block BK1 located to the object side of the second lens blocks BK2 of either of the types described above.

For example, the imaging lens LN may be constructed such that, to the object side of the second lens block BK2 of either of the types described above, a first lens block BK1 is disposed that includes a lens L[LS1o] whose object-side surface is convex to the object side and a lens L[LS1m] whose image-side surface is convex to the image side (the imaging lens LN may include the first and second lens blocks BK1 and BK2 alone as lens blocks BK). Moreover, in this imaging lens LN, the image-side lens surface of the lens L[LS1m] may be an aspherical surface that is convex at its vertex and that is concave in its part where it intersects the principal ray with the maximum image height.

Alternatively, the imaging lens LN may be constructed such that, to the object side of the second lens blocks BK2 of either of the types described above, a first lens block BK1 is disposed that includes a lens L[LS1o] whose object-side surface is convex to the object side and a lens L[LS1m] whose image-side surface is concave to the image side (the imaging lens LN may include the first and second lens blocks BK1 and BK2 alone as lens blocks BK).

In an imaging lens LN that includes a first lens block BK alone as a lens block BK, the object-side lens surface of a lens L[LS1o] may be concave to the object side, and the image-side lens surface of a lens L[LS1m] may be convex to the image side. This design shifts the rear principal point to the image side, and permits the imaging lens LN to have a sufficient back-focal length. In addition, in this imaging lens LN, it is preferable that conditional formula (C5) below be fulfilled. Conditional formula (C5) defines the focal length of the image-side lens surface of the lens L[LS1m] in terms of the focal length of the entire imaging lens LN (the entire system).

$$0.6 \leq f[L[LS1m]m]/f[\text{all}] \leq 2.0 \quad \text{(C5)}$$

where f[L[LS1m/m]] represents the focal length of the image-side lens surface of the lens L[LS1m]; and f[all] represents the focal length of the entire imaging lens LN.

If the value of conditional formula (C5) is less than the lower limit, for example, the positive optical power of the image-side lens surface of the lens L[LS1m] is too strong, and thus the angle of emergence of light from the image-side lens surface of the lens L[LS1m] (and hence the angle of emergence of light from the first block BK1) is excessively large. This leads to lower telecentricity to the image surface. Moreover, owing to the too strong positive optical power on the object-side lens surface of the lens L[LS1m], the imaging lens LN tends to produce aberrations.

By contrast, if the value of conditional formula (C5) is more than the upper limit, for example, owing to the comparatively long focal length of the image-side lens surface of the lens L[LS1m], the imaging lens LN has an increased optical total length.

Thus, when the value of conditional formula (C5) falls within the range from the lower limit to the upper limit, the imaging lens LN is compact and has high performance (for example, telecentricity, and high aberration correction performance).

Here, the direction of refraction in which chromatic aberration occurs in an imaging lens LN including a lens L[LS1o] whose object-side surface is concave to the object side and a lens L[LS1m] whose image-side surface is convex to the image side is different from the direction of refraction in which chromatic aberration occurs in an imaging lens LN including a lens L[LS1o] whose object-side surface is convex to the object side and a lens L[LS1m] whose image-side surface is concave to the image side. Even with such imaging lenses LN, from the viewpoint of chromatic aberration correction, it is preferable that at least one of conditional formulae (C3) and (C4) be fulfilled.

Moreover, in the imaging lens LN, it is preferable that conditional formula (C6) below be fulfilled. Conditional formula (C6) defines the thickness of the first lens substrate LS in terms of the optical total length.

$$0.03 \leq d[LS1]/TL \leq 0.34 \quad \text{(C6)}$$

where d[LS1] represents the thickness of the first lens substrate LS1 along the optical axis; and TL represents the distance from the most object-side surface in the imaging lens LN to the imaging surface along the optical axis.

If conditional formula (C6) is less than the lower limit, the first lens substrate LS1 is so thin that the first lens block BK1 is difficult to manufacture. Moreover, in a case where the first lens substrate LS1 is formed thin by grinding a commercially available glass plate, the cost of the amount of material so ground is wasted. Moreover, the too thin first lens substrate LS1 may necessitate increasing the thicknesses of the lenses L[LS1o] and L[LS1m] with expensive resin, leading to an increased cost of the first lens block BK1 (and hence of the imaging lens LN).

By contrast, if the value of conditional formula (C6) is more than the upper limit, the first lens substrate LS1 is too thick, and hence the first lens block BK1 is too thick. The excessive thicknesses here lead to an increased astigmatic difference.

Moreover, in a three-or-less-element, compact optical system, it is preferable that the most object-side lens be a meniscus lens convex to the object side as disclosed in JP-A-2006-91638 and JP-A-2006-98504. If the first lens substrate LS1 is too thick as mentioned above, however, the first lens block BK1 has a shape far from a thin meniscus shape. This imposes restrictions on the design, in connection with aberration correction, of the imaging lens LN (in short, such an imaging lens LN has low aberration correction performance). In addition, an imaging lens LN including such a first lens block BK1 is unsuitable as a wide-angle lens system.

Thus, when the value of conditional formula (C6) falls within the range from the lower limit to the upper limit, the imaging lens LN is manufactured inexpensively, and in addition is compact and has high performance. It is particularly preferable that, within the conditional range defined by conditional formula (C6), the conditional range defined by conditional formula (C6a) below be fulfilled.

$$0.065 \leq d[LS1]/TL \leq 0.19 \quad \text{(C6a)}$$

In an imaging lens LN fulfilling at least one of conditional formulae (C3) and (C4), and in an imaging lens LN fulfilling conditional formulae (CC1) and (CC2), fulfilling conditional formula (C6) helps properly restrict the widening of the band of light formed (the dispersion of light occurring), when light passes through the first lens substrate LS1, between the optical path SW2 of short wavelength light and the optical path LW2 of long wavelength light.

Moreover, in the imaging lens LN, it is preferable that conditional formula (C7) below be fulfilled. Conditional formula (C7) defines the sum of the aerial distances between the lens blocks BK in terms of the optical total length.

$$Ar/TL \leq 0.5 \quad (C7)$$

where

Ar represents the sum of the aerial distances between adjacent lens blocks BK in the imaging lens LN (also counted as an aerial distance is the thickness of any optical device having no optical power other than a lens block BK, as given as an equivalent thickness in air); and TL represents the distance from the most object-side surface in the imaging lens LN to the imaging surface along the optical axis.

A compact imaging lens LN fulfilling conditional formula (C7), when integrated with an imaging sensor SR, forms a compact module (camera module). The camera module is fitted on a printed circuit board (circuit board) having solder paste printed on it, and is then heated (for reflow soldering); thereby the module is mounted on the printed circuit board.

In such reflow soldering for mounting, the imaging lens LN is placed in an environment close to 300° C. (about 250 to 280° C.). Thus, as shown in FIG. 18C, the air sealed between the lens blocks BK by the spacer member B1 expands. If the air expands excessively, the lens blocks may separate from each other, and thus the imaging lens LN may break.

To prevent such breakage of the imaging lens LN, it is preferable that the imaging lens fulfill conditional formula (C7). Specifically, it is preferable that the aerial distance in the imaging lens LN be as short as possible. It is particularly preferable that, within the conditional range defined by conditional formula (C7), the conditional range defined by conditional formula (C7a) below be fulfilled. Within this conditional range, the air confined inside the imaging lens LN when it is sealed is sufficiently small.

$$Ar/TL \leq 0.45 \quad (C7a)$$

On the assumption that the imaging lens LN is placed in a high temperature environment, it is preferable that the lens substrate LS be formed out of glass with comparatively high resistance to heat. It is particularly preferable that the glass be high-softening-point glass (the heat-resistance etc. of the lens L will be described later).

Shown below in a table are, for each of the practical examples (EX1 to EX8), the results of conditional formulae (C1 to C7). In this table, an underscored value and the symbol "–" signify that the relevant condition is not fulfilled, and the symbol "○" signifies that the relevant condition is fulfilled. Moreover, in the table, the symbol "×" signifies that no value corresponding to the relevant conditional formula can be calculated.

TABLE 17

| | EX1 | EX2 | EX3 | EX4 | EX5 | EX6 | EX7 | EX8 |
|---|---|---|---|---|---|---|---|---|
| | $0.1 < |N[LS1] - N[L[LS1o]]| \ldots (C1)$ | | | | | | | |
| C1 | 0.142 | 0.201 | 0.199 | 0.188 | 0.188 | 0.101 | 0.111 | 0.193 |
| | $0.6 \leq f[L[LS1o]o]/f[all] \leq 2.0 \ldots (C2)$ | | | | | | | |
| C2 | 0.89 | 1.09 | 2.00 | 0.93 | 0.98 | 1.60 | 1.68 | — |
| | $0.1 < N[LS1] - N[L[LS1o]] \ldots (C3)$ | | | | | | | |
| C3 | 0.142 | 0.201 | 0.199 | 0.188 | 0.188 | 0.101 | 0.111 | 0.193 |
| | $v[LS1] < v[L[LS1o]] \ldots (C4)$ | | | | | | | |
| C4 | ○ | ○ | ○ | ○ | ○ | — | ○ | — |
| | $0.6 \leq f[L[LS1m]m]/f[all] \leq 2.0 \ldots (C5)$ | | | | | | | |
| C5 | X | X | X | X | X | X | X | 0.99 |
| | $0.03 \leq d[LS1]/TL \leq 0.34 \ldots (C6)$ | | | | | | | |
| C6 | 0.09 | 0.12 | 0.26 | 0.17 | 0.17 | 0.30 | 0.34 | 0.22 |
| | $Ar/TL \leq 0.5 \ldots (C7)$ | | | | | | | |
| C7 | 0.26 | 0.43 | 0.45 | 0.29 | 0.26 | 0.58 | 0.51 | 0.67 |

Embodiment 2

Embodiment 2 will now be described. Such members as function similarly to their counterparts in Embodiment 1 are identified by common reference signs and no description of them will be repeated. In this embodiment, the resin out of which the lenses L are formed will be discussed.

Resin excels in workability. Thus, forming the lenses L enumerated in connection with Embodiment 1 out of resin allows easy formation of aspherical lens surfaces by use of molds or the like.

Generally, however, if fine particles are mixed in transparent resin (such as polymethyl methacrylate), light is scattered inside the resin, and lower transmittance results. Thus, resin containing fine particles can be said to be unsuitable as an optical material.

Moreover, the index of refraction of resin varies with temperature. For example, let us calculate, according to the Lorenz-Lorenz formula (LL) below, the temperature dependence of the index of refraction of polymethyl methacrylate (PMMA), that is, its temperature-dependent refractive-index variation (dn/dt).

[Formula LL]

$$\frac{dn}{dt} = \frac{(n^2+2) \times (n^2-1)}{6n} \times \left\{(-3\alpha) + \frac{1}{[R]} \times \frac{\partial [R]}{\partial t}\right\} \quad (LL)$$

where n represents the index of refraction of the resin;

t represents temperature;

$\alpha$ represents the coefficient of linear expansion (with PMMA, $\alpha = 7 \times 10^{-5}$); and

[R] represents molecular refraction.

Then, with PMMA, the refractive-index variation is found to be $-1.2 \times 10^{-4}$/° C. This value approximately agrees with actual measurements. Thus, forming the lenses L out of resin (plastic) alone results in their refractive-index variation being dependent on temperature. If, in addition, fine particles are mixed in such resin out of which the lenses are formed, the lenses L then not only scatter light but also change their indices of refraction with temperature.

In recent years, however, it has increasingly been recognized that resin containing properly designed fine particles can be used as an optical material. This is because, in resin containing fine particles (a mixed resin), if the particle diameter of the fine particles is smaller than the wavelength of transmitted light, no scattering of light occurs.

In addition, when the fine particles are inorganic ones, their index of refraction increases as temperature increases. Thus, in a mixed resin, as temperature rises, the index of refraction of the resin decreases and simultaneously the index of refraction of the inorganic fine particles increases. In this way, their respective temperature dependence (the decrease in the index of refraction of one and the increase in the index of refraction of the other) is canceled out, with the result that the index of refraction of the mixed resin varies less with temperature (for example, in the lenses L, the variation of their index of refraction is reduced to as small as the effect of the variation of the surface shape on the positions of the paraxial image points).

As one example of a mixed resin as described above, JP-A-2007-126636 discloses one having inorganic fine particles with a maximum length of 30 nm or less (an added material, such as niobium oxide ($Nb_2O_5$)) dispersed in resin (a base material).

In light of the foregoing, when the lenses L are formed out of resin having fine particles of 30 nm or less dispersed in it (a mixed resin), the imaging lens LN including those lenses L has high durability to temperature. Moreover, for example, by properly adjusting the ratio of resin to inorganic fine particles in the mixed resin, the length of the particle diameter of the inorganic fine particles (for example, 20 nm or less, further preferably 15 nm or less), the kind of resin used as the base material, and the kind of inorganic fine particles used as the added material, it is possible to give the lenses L high indices of refraction. Thus, when the lenses L are formed out of a mixed resin, the imaging lens LN including those lenses L is more compact, and the lenses L are less difficult to mold.

It is preferable that the resin mentioned above be a hardening resin. This is because a hardening resin allows easy manufacture of the lenses L including aspherical surfaces by use of molds or the like. Moreover, when the resin is adhesive (or when adhesive is mixed in the resin), the lenses L formed out of it can be cemented to the lens substrates LS easily. That is, the lens blocks including the lens substrates LS and lenses L directly bonded together are manufactured easily.

Furthermore, it is preferable that the resin mentioned above is heat-resistant. For example, a module (camera module) having the imaging lens LN and the image sensor SR integrated into a unit is fitted on a printed circuit board having solder paste printed on it, and is then heated (for reflow soldering); thereby the module is mounted on the printed circuit board. Such mounting is handled by automation. Thus, when the lenses L are formed out of a heat-resistant hardening resin, they withstand reflow soldering, and are therefore suitable for automation (needless to say, it is preferable that the lens substrates LS also be formed out of a material with high resistance to heat, for example, glass).

Examples of hardening resins include thermosetting resins and ultraviolet (UV)-curing resins.

With a thermosetting resin, even when the lenses L are comparatively thick, they are manufactured accurately. On the other hand, with an UV-curing resin, since it hardens in a comparatively short time, the lenses can be manufactured in a short time.

It should be understood that the embodiments specifically described above are not meant to limit the present invention, and that many variations and modifications can be made within the spirit of the present invention.

The invention claimed is:

1. An imaging lens comprising:
two lens blocks each including
a lens substrate that is a parallel plate, and
a lens contiguous with at least one of object-side and image-side substrate surfaces of the lens substrate, the lens exerting a positive or negative optical power; and
wherein, in each of said two lens blocks, said lens included therein is formed of a material different from a material of which said lens substrate is formed;
wherein said two lens blocks comprise a first lens block disposed at a most object-side position, the first lens block exerting a positive optical power and including,
as said lens substrate, a first lens substrate, and
as said lens, a lens L[LS1o] contiguous with an object-side substrate surface of the first lens substrate,
wherein an object-side lens surface of the lens L[LS1o] is convex to an object side,
wherein conditional formula (C2) below is fulfilled:

$$0.6 \leq f[L[LS1o]o]/f[all] \leq 2.0 \qquad (C2)$$

where
f[L[LS1o]o] represents a focal length of the object-side lens surface of the lens L[LS1o]; and
f[all] represents a focal length of the entire imaging lens, and
wherein the second lens block is located to an image side of the first lens block and includes, as said lens substrate, a second lens substrate and, as said lens, a lens L[LS2o] contiguous with an object-side substrate surface of the second lens substrate and a lens L[LS2m] contiguous with an image-side substrate surface of the second lens substrate, an object-side lens surface of the lens surface of the lens L[LS2o] being concave to an object side, an image-side lens surface of the lens L[LS2m] being aspherical.

2. The imaging lens according to claim 1,
wherein conditional formula (C4) below is fulfilled:

$$v[LS1] < v[L[LS1o]] \qquad (C4)$$

where
v[LS1] represents the Abbe number of the first lens substrate; and
v[L[LS1o]] represents the Abbe number of the lens L[LS1o].

3. The imaging lens according to claim 1,
wherein
the first lens block further includes, as said lens, a lens L[LS1m] contiguous with an image-side substrate surface of the first lens substrate, an image-side lens surface of the lens L[LS1m] being convex to an image side.

4. The imaging lens according to claim 3,
wherein the image-side lens surface of the lens L[LS1m] is an aspherical surface that is convex at a vertex thereof and that is concave in a part thereof intersecting a principal ray with a maximum image height.

5. The imaging lens according to claim 1,
wherein
the first lens block further includes, as said lens, a lens L[LS1m] contiguous with an image-side substrate surface of the first lens substrate, an image-side lens surface of the lens L[LS1m] being concave to an image side.

6. The imaging lens according claim 1,
wherein conditional formula (C6) below is fulfilled:

$$0.03 \leq d[LS1]/TL \leq 0.34 \qquad (C6)$$

where
- d[LS1] represents a thickness of the first lens substrate along the optical axis; and
- TL represents a distance from a most object-side surface in the imaging lens to an imaging surface along the optical axis.

7. The imaging lens according to claim 1,
wherein conditional formula (C7) below is fulfilled:

$$Ar/TL \leq 0.5 \qquad (C7)$$

where
- Ar represents a sum of aerial distances between adjacent lens blocks in the imaging lens (including a thickness of any optical element having no optical power other than a lens block, as given as an equivalent thickness in air); and
- TL represents a distance from a most object-side surface in the imaging lens to an imaging surface along the optical axis.

8. The imaging lens according to claim 1,
wherein said lens substrate is formed of glass.

9. The imaging lens according to claim 1,
wherein said lens is formed of resin.

10. The imaging lens according to claim 9,
wherein the resin of which the lens is formed has inorganic fine particles with a particle diameter of 30 nm or less dispersed therein.

11. The imaging lens according to claim 9,
wherein the resin is a hardening resin.

12. An imaging device comprising:
the imaging lens according to claim 1; and
an imaging sensor sensing light passing through the imaging lens.

13. A portable terminal comprising:
the imaging device according to claim 12.

14. A method of manufacturing the imaging lens according to claim 1, where a unit including, as each of the two lens blocks, a plurality of lens blocks arranged in an array is a lens unit block, said method comprising the steps of:
- a joining step of arranging a spacer at least at part of a peripheral edge of the lens blocks and joining the plurality of lens block units together with the spacer in between; and
- a cutting step of cutting the joined-together lens block units along the spacer.

\* \* \* \* \*